US010443966B2

(12) United States Patent
Chakraborty et al.

(10) Patent No.: US 10,443,966 B2
(45) Date of Patent: Oct. 15, 2019

(54) SYSTEMS, METHODS, AND APPARATUSES FOR IMPLEMENTING VIDEO SHOOTING GUNS AND PERSONAL SAFETY MANAGEMENT APPLICATIONS

(71) Applicants: Rabindra Chakraborty, Johns Creek, GA (US); Jay Kalra, San Jose, CA (US); Anupam Awasthi, Saratoga, CA (US); Amol Awasthi, Dubai (AE)

(72) Inventors: Rabindra Chakraborty, Johns Creek, GA (US); Jay Kalra, San Jose, CA (US); Anupam Awasthi, Saratoga, CA (US); Amol Awasthi, Dubai (AE)

(73) Assignee: SENSLYTICS CORPORATION, San Jose, CA (US)

( * ) Notice: Subject to any disclaimer, the term of this patent is extended or adjusted under 35 U.S.C. 154(b) by 0 days.

(21) Appl. No.: 15/160,213

(22) Filed: May 20, 2016

(65) Prior Publication Data

US 2017/0284754 A1 Oct. 5, 2017

Related U.S. Application Data

(60) Provisional application No. 62/317,822, filed on Apr. 4, 2016.

(51) Int. Cl.
*H04N 5/77* (2006.01)
*F41A 17/06* (2006.01)
(Continued)

(52) U.S. Cl.
CPC .......... *F41A 17/063* (2013.01); *F41A 17/066* (2013.01); *F41C 9/02* (2013.01);
(Continued)

(58) Field of Classification Search
CPC ...................................................... F41A 17/063
(Continued)

(56) References Cited

U.S. PATENT DOCUMENTS 9,488,437 B1 * 11/2016 Schnog ................. F41J 5/10
2010/0284683 A1 * 11/2010 Fressola ............. F41H 13/0025
396/429

(Continued)

OTHER PUBLICATIONS

Encyclopedia of Internet Technologies and Applications By: Periera, Manuela; Freire, Mário Marques. Hershey : IGI Global. 2008 (Year: 2008).*

(Continued)

*Primary Examiner* — William C Vaughn, Jr.
*Assistant Examiner* — Daniel Tekle
(74) *Attorney, Agent, or Firm* — Womble Bond Dickinson (US) LLP

(57) ABSTRACT

In accordance with disclosed embodiments, there are provided systems, methods, and apparatuses for implementing video shooting guns and personal safety management applications. An exemplary personal safety device may include, for example, a processor and a memory to execute instructions; a rechargeable battery to electrically power the personal safety device; a front facing video camera to capture video data of a scene anterior to a front face of the personal safety device; a rear facing video camera to capture video data of a scene posterior to a rear of the personal safety device; an audio capture device to capture audio data from an environment within which the personal safety device is to operate; a trigger to initiate recording of the front facing video camera, the rear facing video camera, and the audio capture device when triggered by an operator of the personal safety device; and a transceiver to transmit the recorded video data from the front and rear cameras and the captured audio data to a remote location over a network. According (Continued)

to another embodiment, a holster operates in conjunction with a body camera to activate audio and video capture and streaming upon removal of a firearm from the holster. Other related embodiments are disclosed.

18 Claims, 17 Drawing Sheets

(51) Int. Cl.
    *H04N 7/18*     (2006.01)
    *H04N 1/00*     (2006.01)
    *H04N 5/232*     (2006.01)
    *F41C 33/02*     (2006.01)
    *G06Q 50/26*     (2012.01)
    *H04W 4/04*     (2009.01)
    *H04W 4/80*     (2018.01)
    *H04W 4/029*     (2018.01)
    *F41C 9/02*     (2006.01)
    *F41J 5/10*     (2006.01)
    *H04N 5/247*     (2006.01)
(52) U.S. Cl.
    CPC ............... *F41C 33/029* (2013.01); *F41J 5/10* (2013.01); *G06Q 50/265* (2013.01); *H04N 1/00204* (2013.01); *H04N 5/232* (2013.01); *H04N 5/247* (2013.01); *H04N 5/77* (2013.01); *H04N 7/181* (2013.01); *H04N 7/188* (2013.01); *H04W 4/029* (2018.02); *H04W 4/043* (2013.01); *H04W 4/80* (2018.02)

(58) Field of Classification Search
    USPC ......................................................... 386/223
    See application file for complete search history.

(56) References Cited

U.S. PATENT DOCUMENTS

| | | | |
|---|---|---|---|
| 2015/0085184 A1* | 3/2015 | Vidal | .................. H04N 5/2252 348/376 |
| 2015/0113851 A1* | 4/2015 | Bensayan | ............. F41A 17/063 42/117 |
| 2016/0092501 A1 | 3/2016 | Chakraborty et al. | |

OTHER PUBLICATIONS

U.S. Appl. No. 14/735,975, filed Jun. 10, 2015.

\* cited by examiner

SYSTEMS, METHODS, AND APPARATUSES FOR IMPLEMENTING VIDEO SHOOTING GUNS AND PERSONAL SAFETY MANAGEMENT APPLICATIONS

CLAIM OF PRIORITY

This non-provisional utility patent application is related to and claims priority to the U.S. Provisional application entitled "VIDEO SHOOTING GUNS USING PERSONAL SAFETY MANAGEMENT APPLICATIONS," filed on Apr. 4, 2016, having a U.S. Provisional patent application No. 62/317,822, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing video shooting guns and personal safety management applications. Other embodiments relate to holsters operable in conjunction with body cameras to activate audio and video capture and streaming upon removal of a firearm from such a holster.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

There is a presently a national conversation with regard to guns, gun availability, gun safeguards, gun violence prevention, personal freedoms and the right of individuals to purchase and carry guns, and a variety of ancillary discussions. Politicians and citizens occupy a wide array of opinions and positions on these complex issues and some individuals experience personal conflict as they consider themselves to personally dislike guns and gun ownership, yet nevertheless have a legitimate interest in their own personal safety.

Regardless of the current political climate and the personal opinion of any one individual, there is a universal desire by all individuals to remain safe which often leads persons to invest in a wide array of personal safety means ranging from whistles to mace to Taser™ devices and ultimately to personally owned and carried firearms or "guns."

There exists a segment of the population which desires to maximize their personal safety but is unwilling to carry a firearm. Moreover, some industry experts opine that it is not the carrying of a firearm which actually keeps one safe, but rather, it is the perceived sense of self protection and the perceived sense of personal safety and ultimately empowerment which is attained by carrying the firearm, rather than actually discharging or firing the firearm.

Those individuals seeking such a sense self protection and presumed personal safety offered by carrying the firearm are therefore confronted with a dilemma when those same individuals are opposed to guns in general or opposed to the carrying of a firearm for the purposes of personal safety, regardless of their reasons, justifications, or motivations.

The present state of the art may therefore benefit from the systems, methods, and apparatuses for implementing video shooting guns and personal safety management applications as is described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
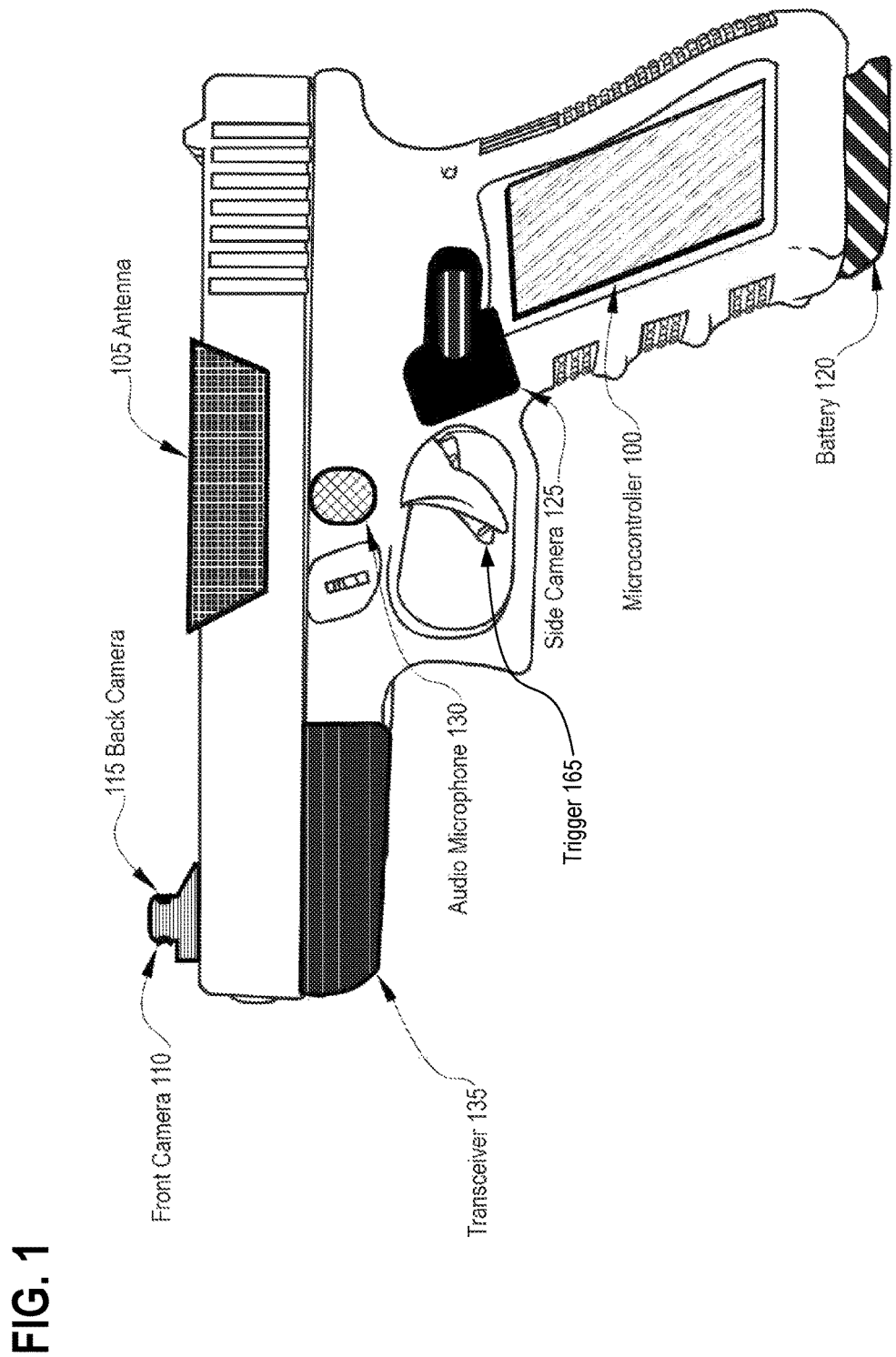
FIG. 1 depicts a non-dischargeable video capture gun apparatus in accordance with described embodiments.

Described herein are systems, methods, and apparatuses for implementing video shooting guns and personal safety management applications. An exemplary personal safety device may include, for example, a processor and a memory to execute instructions; a rechargeable battery to electrically power the personal safety device; a front facing video camera to capture video data of a scene anterior to a front face of the personal safety device; a rear facing video camera to capture video data of a scene posterior to a rear of the personal safety device; an audio capture device to capture audio data from an environment within which the personal safety device is to operate; a trigger to initiate recording of the front facing video camera, the rear facing video camera, and the audio capture device when triggered by an operator of the personal safety device; and a transceiver to transmit the recorded video data from the front and rear cameras and the captured audio data to a remote location over a network. According to another embodiment, a holster operates in conjunction with a body camera to activate audio and video capture and streaming upon removal of a firearm from the holster.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts a non-dischargeable video capture gun apparatus in accordance with described embodiments. In particular, there are depicted both a front camera 110 and a back camera on the video shooting gun and also an antenna 105 to enable the gun apparatus to communicate with, for example, a cloud computing architecture under the control of microcontroller 100. For instance, a transceiver 135 embedded within or configured with the gun apparatus may communicate with a remote device, such as a cellular base station which in turn communicates information between the gun apparatus to a cloud computing analytics system or storage repository, etc.

According to certain embodiments, the gun apparatus captures video and audio via the depicted cameras. For instance, video may be captured by the gun apparatus of a scene in front of the gun apparatus via front camera 110 or of a scene behind the gun apparatus via back camera 115. According to certain embodiments, one or more side cameras or auxiliary cameras are additionally included, such as the depicted side camera(s) 125 shown here. An audio microphone 130 captures audio signals from the environment and scene within which the gun apparatus operates. Further depicted is battery 120 to power the gun apparatus. According to described embodiments the apparatus is battery 120 operated and may be re-charged via a charging station or via a USB powered connector.

Microcontroller having at least a processor and a memory embodied therein is further depicted and is capable of executing instructions and performing operations including, for instance, initiating the recording and capture of audio and video as well as coordinating the streaming of such audio and video to a remote repository, initiating events, receiving information, receiving alerts, sending and triggering alerts, etc.

It cannot be denied that guns and gun ownership and gun policy in general can be a contentious issue with complex considerations on all sides of the issues. However, described herein is a non-dischargeable gun apparatus, meaning that it cannot and indeed does not fire ammunition, and therefore, is not to be considered a lethal weapon. Such a gun apparatus provides specific benefits and capabilities to those individuals who desire for a sense of personal protection yet are opposed, for whatever their reason, to personal gun ownership or gun use.

For example, the mere act of carrying a non-dischargeable gun apparatus such as that which is disclosed herein provides both a psychological benefit through a perceived sense of personal safety by carrying such a gun apparatus versus not carrying such an apparatus and additionally provides an actual deterrent to potential threats to an individual's personal safety as the gun apparatus can be designed to look authentic. For instance, the gun apparatus depicted here includes a faux gun barrel which, though it is non-functional, enables the individual carrying such a gun apparatus to project a show of force in the face of danger. It is very possible that the mere showing of such gun apparatus provides an increase in personal safety when confronted with a threat as the perpetrator of the threat is likely to retreat, with the perpetrator having no way of knowing that the gun apparatus is not in fact a lethal weapon.

In the event that the perpetrator does not retreat, the gun apparatus is capable of capturing video and audio of the situation and summoning the authorities according to certain embodiments.

Moreover, the non-dischargeable gun apparatus is capable of capturing audio and video and other telemetry data in support of an investigation into a crime, such as an attempted mugging, and in a worst case scenario, the non-dischargeable gun apparatus may provide invaluable data and telemetry in support of an investigation into an actual firearm shooting by the perpetrator.

Such a non-dischargeable gun apparatus may be manufactured by conventional gun manufacturers wishing to enter the segment of the market for non-lethal personal protection devices. Many manufacturers already have experience in this space as they produce other non-lethal personal safety devices such as mace, Tasers™, etc.

According to a particular embodiment, the non-dischargeable gun apparatus does not fire bullets or ammunition when a trigger 165 is pulled, however, the non-dischargeable gun apparatus captures audio and video. According to one embodiment, the non-dischargeable gun apparatus captures and immediately streams audio and video to a remote cloud repository if connected via transceiver 135 to a network. According to another embodiment, the non-dischargeable gun apparatus captures and immediately streams audio and video to a remote cloud repository via transceiver 135 upon establishing a connection with a network if the device is not connected with the network at the time that the trigger 165 is pulled.

According to a particular embodiment, the non-dischargeable gun apparatus captures and records front facing video via front camera 110 and captures and records back facing video via back camera 115 and captures and records audio via audio microphone 130 and optionally captures and records side facing video via one or more side cameras 125. According to such an embodiment, the non-dischargeable gun apparatus transmits the captured and recorded video and audio stream to a remote cloud based repository along with logged telemetry data including, for example, the time of the trigger pull, time markers for the audio and video streams, GPS location information for the non-dischargeable gun apparatus, and an identification associating the non-dischargeable gun apparatus with the owner of the non-dischargeable gun apparatus.

According to certain embodiments, recordation and capture of the audio and video streams result in a locally stored video file as well as a transmitted audio/video stream. Such a locally stored video file contains one or more of the following elements: video data, date and time stamp for the video capture time, GPS location of the video capture, information of the owner of the personal safety apparatus and optionally finger-print identification for the user. Such information may additionally be transmitted to a cloud computing repository with the audio and video stream. According to certain embodiments, the video is searchable and may be tagged to identify content. For instance, the video may be searched and tagged automatically utilizing video search tools and video analytics.

According to a particular embodiment, the audio, video, and telemetry captured, recorded, and transmitted to the remote cloud based repository is stored for later analysis. According to such an embodiment, the information transmitted to the cloud based repository additionally provides a full accounting of the incident and additionally provides a full audio and video recording of the incident supplemented by the telemetry data. Such data may be used for investigative purposes, training purposes, legal purposes, etc., providing actual evidence which almost never exists with actual shootings.

Figure 2A:
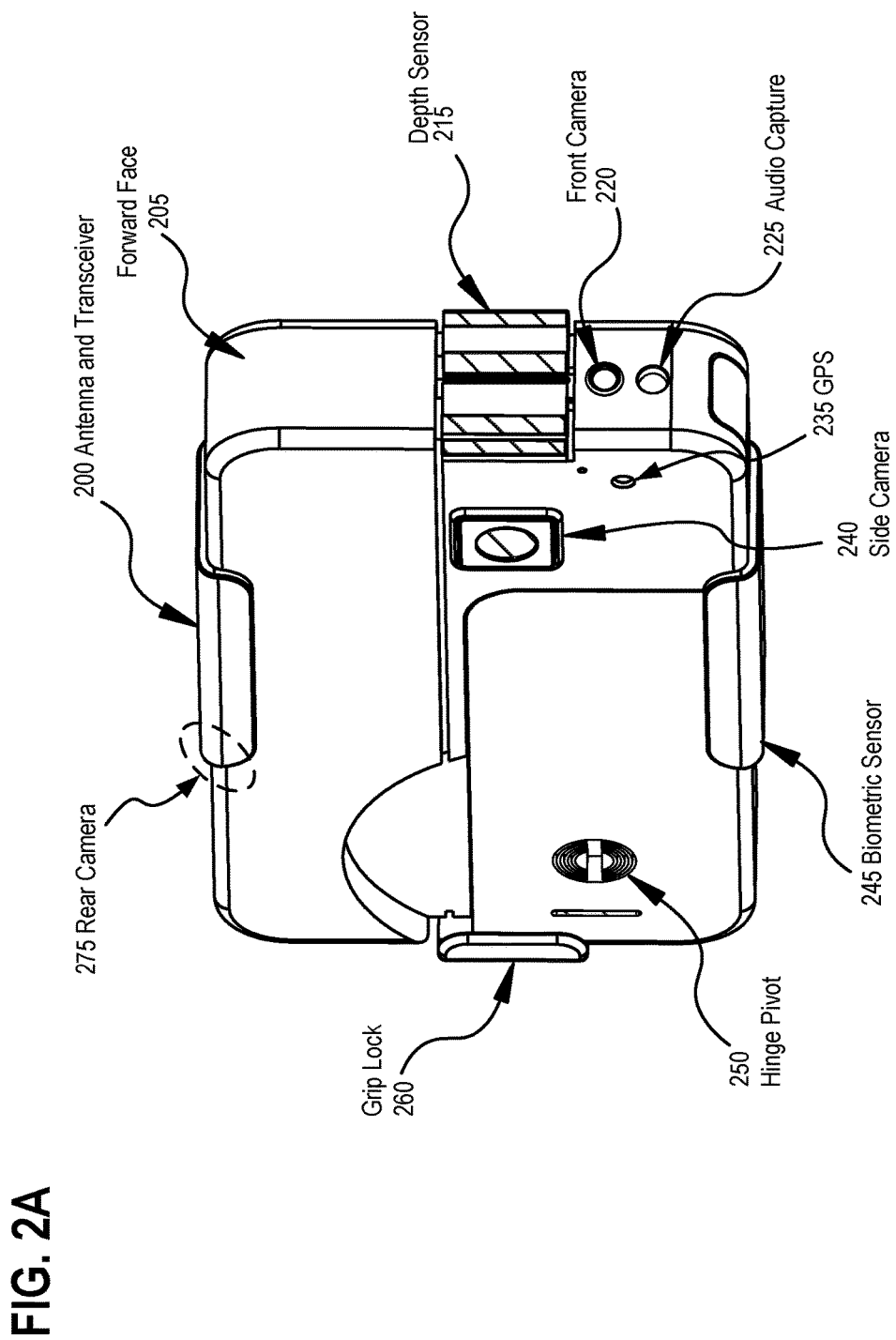
FIG. 2A depicts a collapsible non-dischargeable video capture gun apparatus in a closed position accordance with described embodiments.

FIG. 2A depicts a collapsible non-dischargeable video capture gun apparatus in a closed position accordance with described embodiments. The gun apparatus may, but need not resemble a firearm precisely. For instance, depicted here is a non-dischargeable video capture gun apparatus which is capable of being opened and closed, thus making it easier to conceal and potentially more likely to be carried as it can be carried, for instance, in a purse, handbag, small holster, and so forth.

Moreover, as depicted, the gun apparatus depicted here lacks the faux gun barrel on its forward face 205 in comparison to the gun apparatus at FIG. 1, and thus, resembles an actual gun or firearm to a lesser extent, especially when in a closed position. Such an apparatus may be more desirable to certain individuals, yet provide many the aforementioned benefits.

For instance, the non-dischargeable video capture gun apparatus depicted here includes antenna and embedded transceiver 200 and includes additional sensor 245 capable of reading biometric data from user. Rear camera, 275, side camera 240, and front camera 220 are additionally depicted here as is audio capture device 225. Depth sensor 215 is depicted here as an optional sensor capable of sensing and determining depth to objects in a scene recorded by front facing camera 220. Further depicted are GPS sensor 235 capable of receiving and recording GPS coordinates and a grip lock 260 and hinge pivot 250.

Figure 2B:
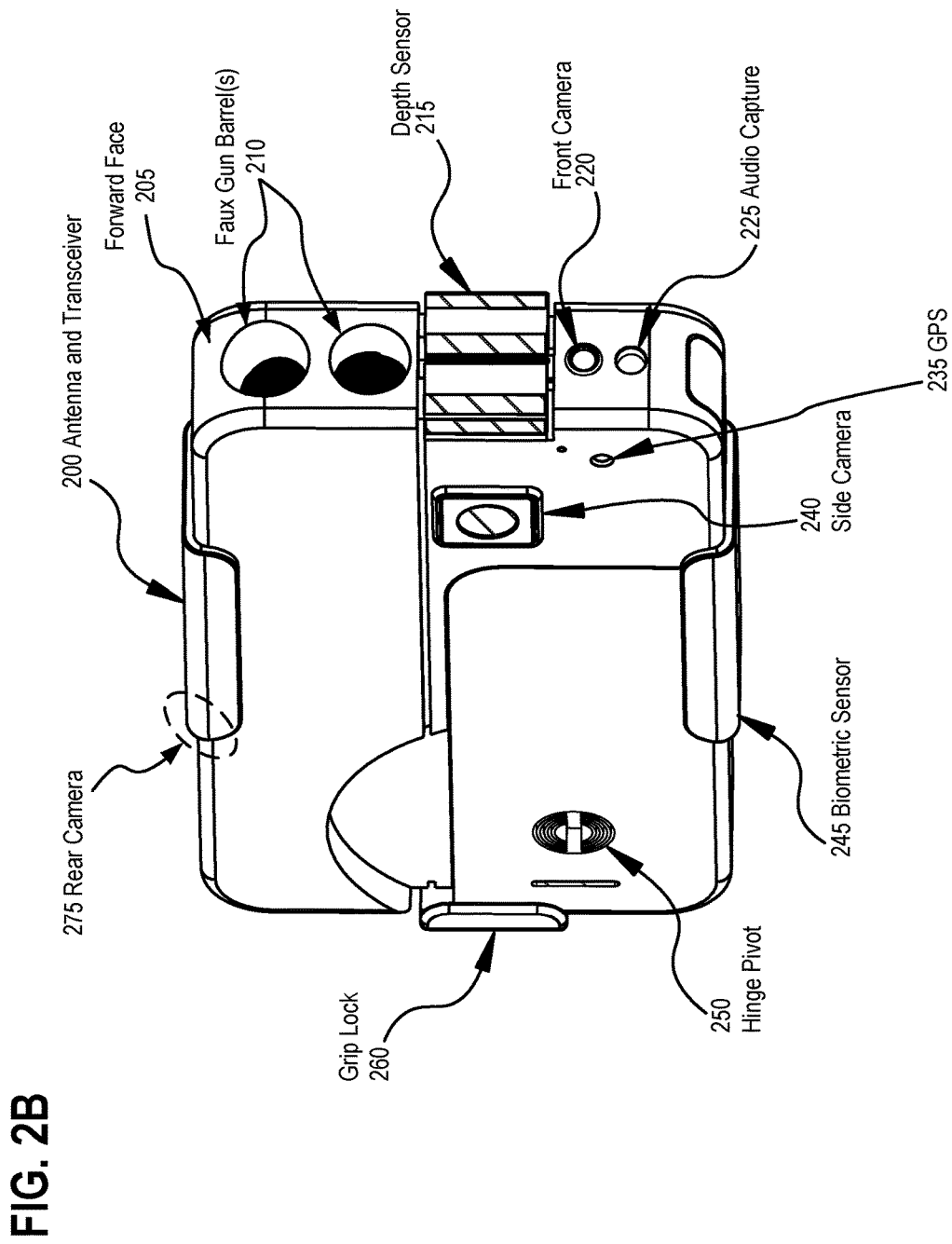
FIG. 2B depicts an alternative embodiment of a collapsible non-dischargeable video capture gun apparatus in a closed position accordance with described embodiments.

FIG. 2B depicts an alternative embodiment of a collapsible non-dischargeable video capture gun apparatus in a closed position accordance with described embodiments. Similar to FIG. 2A, various sensors, cameras, and audio capture components are depicted. Further depicted here on the forward face 205 are two faux gun barrels 210 to increase the authenticity of the gun apparatus when in an open position. Notwithstanding the presence of the faux gun barrels 210 the gun apparatus remains a non-dischargeable and non-lethal self-protection device.

Figure 3A:
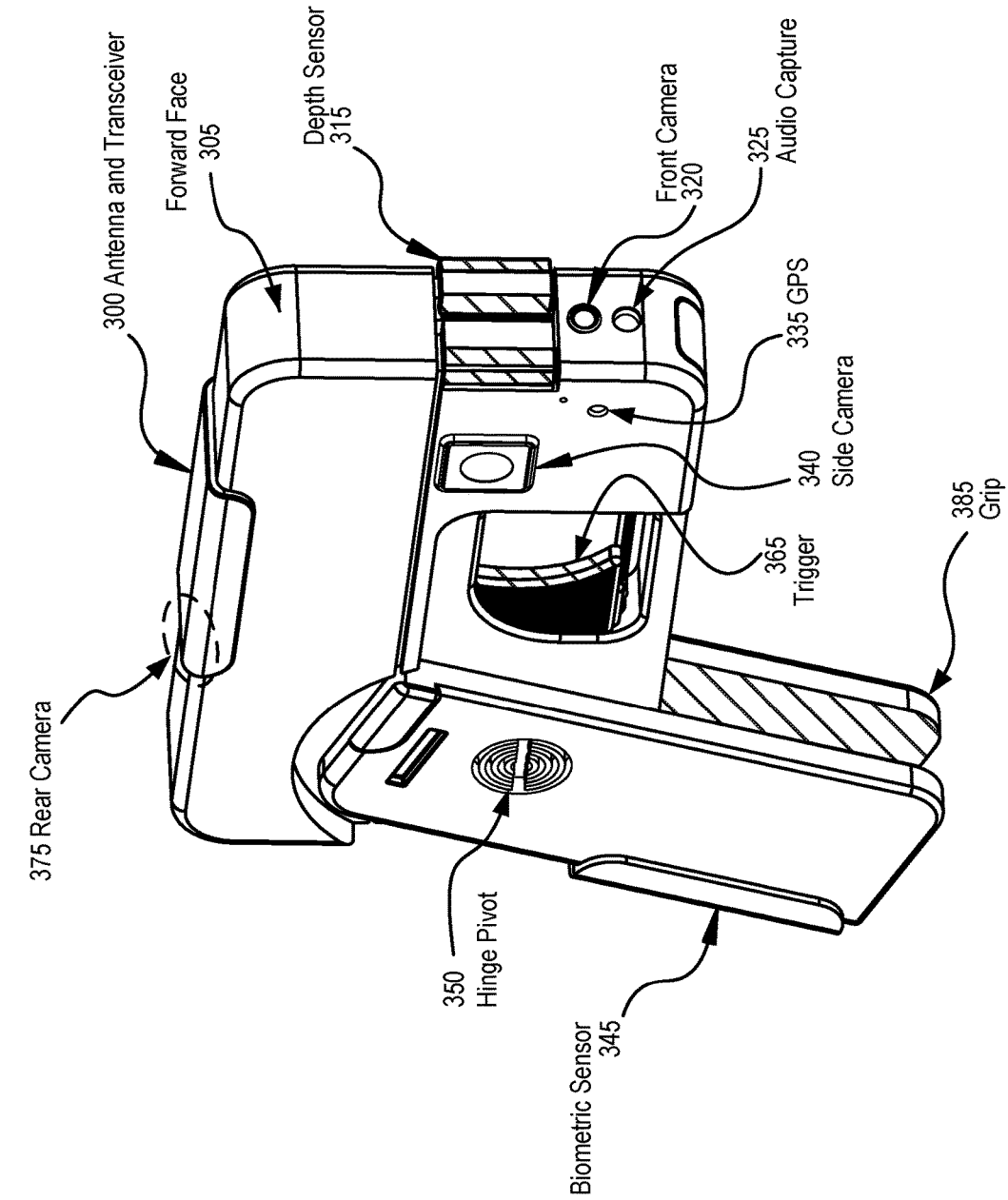
FIG. 3A depicts a collapsible non-dischargeable video capture gun apparatus in an open position accordance with described embodiments.

FIG. 3A depicts a collapsible non-dischargeable video capture gun apparatus in an open position accordance with described embodiments. As can be seen here, the gun apparatus may be opened by opening grip 385 which pivots to an open position via hinge pivot 350 so as to more closely resemble a firearm. Depicted here the forward face 305 of the gun apparatus lacks the faux gun barrel(s).

According to the depicted embodiment, there are provided with the gun apparatus a rear camera 375, a front camera 320, one or more side cameras 340, a GPS sensor 335, an audio capture device 325, a depth sensor 315, antenna and transceiver 300, and biometric sensor 345. Now viewable also in this embodiment with the grip 385 in the open position is trigger 365.

Figure 3B:
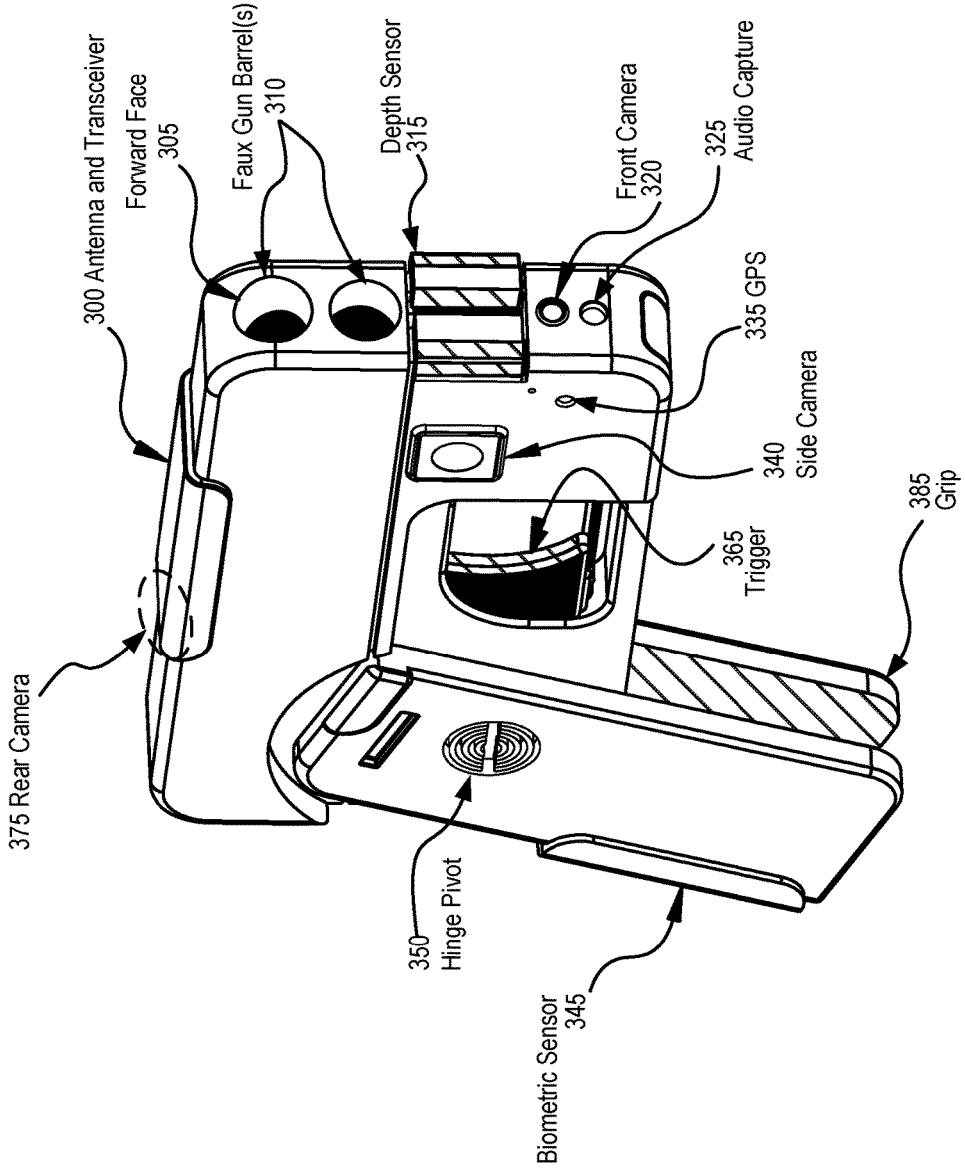
FIG. 3B depicts an alternative embodiment of a collapsible non-dischargeable video capture gun apparatus in an open position accordance with described embodiments.

FIG. 3B depicts an alternative embodiment of a collapsible non-dischargeable video capture gun apparatus in an open position accordance with described embodiments. Here, the gun apparatus resembles a firearm to a greater degree due to its having one or more faux gun barrels 310 on its forward face 305 in addition to the other sensors and cameras described above.

Figure 4A:
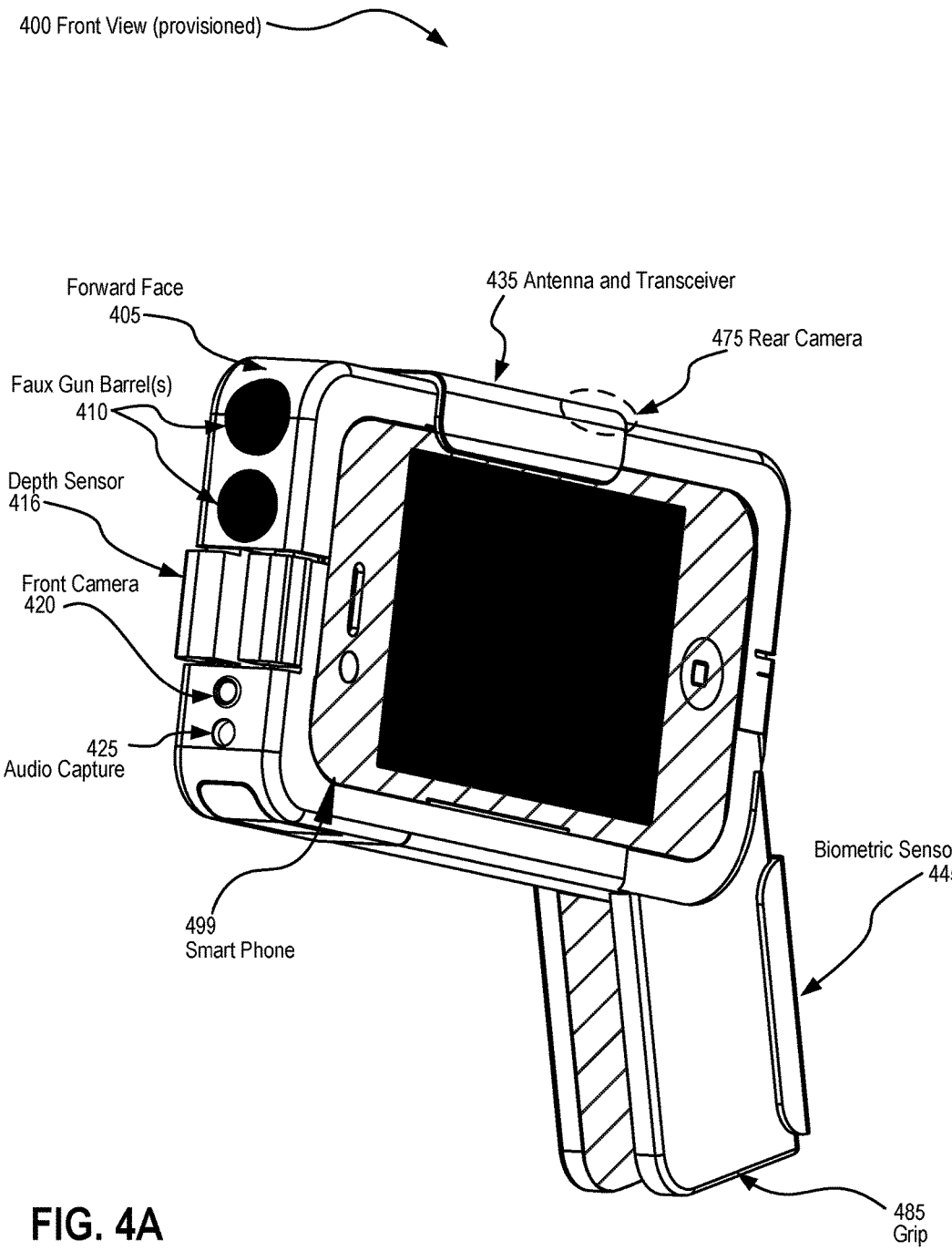
FIG. 4A depicts a front view of a collapsible non-dischargeable video capture gun in an open position and having a smartphone housing embodied therein in accordance with described embodiments.

FIG. 4A depicts a front view 400 of a collapsible non-dischargeable video capture gun with the grip 485 in an open position and having a smartphone housing embodied therein in accordance with described embodiments.

According to particular embodiments the non-dischargeable video capture gun apparatuses may take the form of a smartphone and case when in a closed or collapsed position or alternatively be opened to take the form factor of an authentic appearing firearm. However, because the apparatus is a non-dischargeable video capture gun apparatuses and not an actual firearm, it is not considered a concealed weapon, but may nevertheless be utilized to deter a potential assailant as the visual appearance will likely scare off a potential attacker.

According to certain embodiments, the gun apparatus forms a housing for a smartphone and in such a way may utilize certain functionalities of the smartphone device when provisioned with the gun apparatus while retaining other functionalities within the gun apparatus itself, whether or not they are redundant to or duplicated by the smart phone.

For instance, as is depicted here, the gun apparatus is depicted in an open position in which it can be seen as having its own capabilities embodied within the gun apparatus are one or more gun barrel(s) 410 upon the forward face 405 of the gun apparatus, a depth sensor 416, front camera 420 and rear camera 475, audio capture device 425, biometric sensor 445, and antenna and transceiver 435.

The provisioned smartphone 499 as depicted here is mechanically matched to the housing formed by the gun apparatus such that the smartphone 499 may be attached and held securely in place. Such a smartphone 499 when provisioned with the gun apparatus may provide additional capabilities. For instance, the gun apparatus may communicate with the smartphone 499 via blue tooth or USB or other physical or wireless interface and may, for instance, store information on the smart phone, operate in conjunction with a software mobile "app" or application executing on the smartphone 499, or utilize the wireless and cellular communication capabilities of the smartphone 499 as a redundant communication path to the remote cloud based storage repository in the event that the antenna and transceiver 435 are unable to establish a connection or unable to establish a satisfactory connection through which to stream video and audio to the cloud based repository.

According to described embodiments, video and audio streams as well as telemetry data are first cashed via memory within the apparatus and in the event of a network connectivity issue, the cached data is stored until it may later be transmitted to a remote cloud based repository or a remote destination according to its configured operation.

According to certain embodiments, video and audio streams as well as telemetry data are first cashed via memory within the apparatus and are subsequently automatically uploaded to a clouded based repository when a WiFi transceiver of the apparatus gains network connectivity.

According to certain embodiments, cashed, streamed, and archived audio, video, and telemetry data is protected from deletion and manipulation by the cloud based repository. For instance, in certain embodiments, the data cannot be erased or deleted from the apparatus or the cloud based repository for safety purposes in the event that evidence is captured and the apparatus falls outside of the rightful owner's control. In certain embodiments, varying levels of authentication may be configured by a user to pre-determine under what circumstances, if any, such data may be deleted from the apparatus or from the cloud based repository once transmitted for remote storage.

Figure 4B:
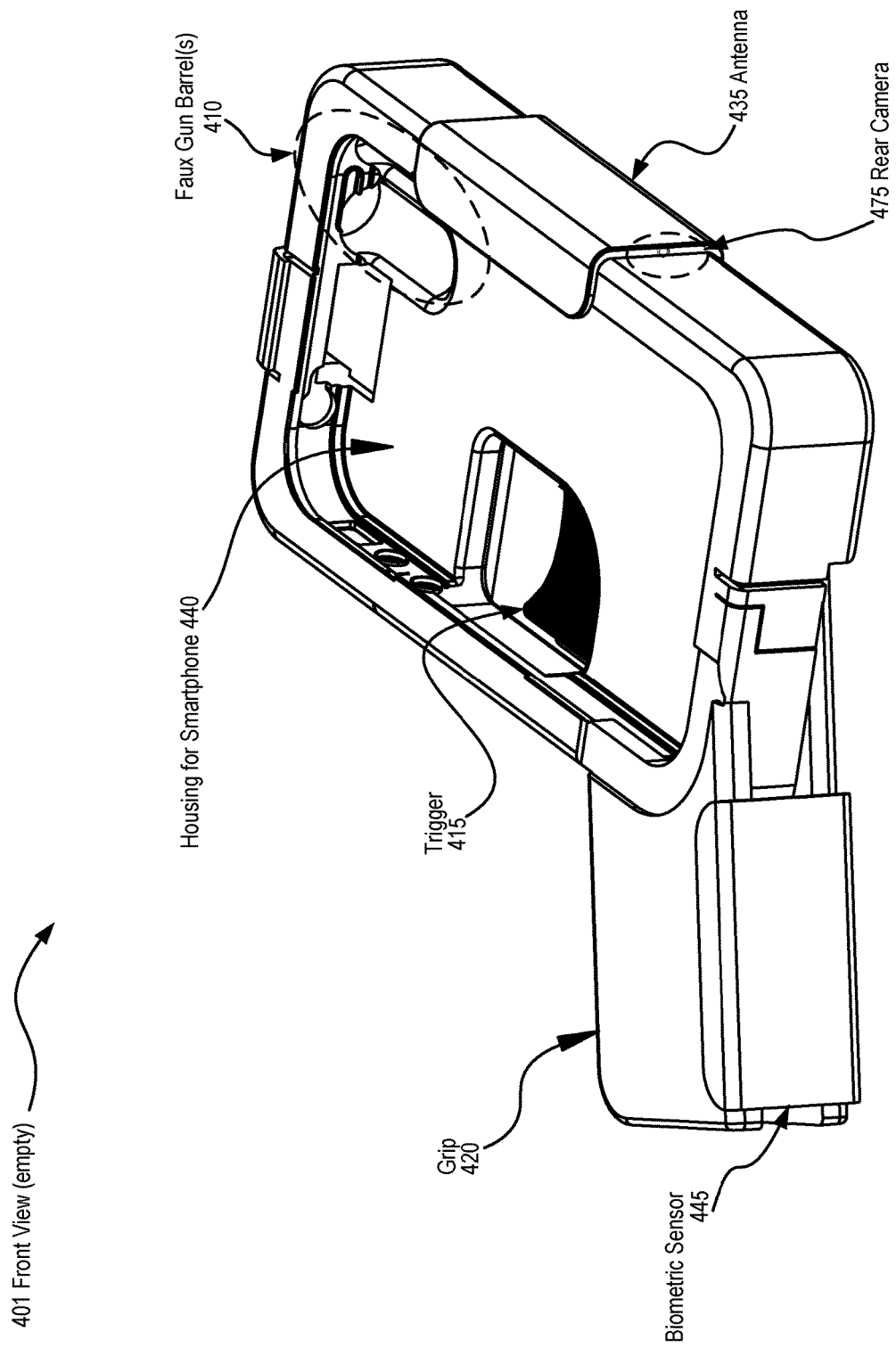
FIG. 4B depicts a front view of a collapsible non-dischargeable video capture gun in an open position and having an empty smartphone housing embodied therein in accordance with described embodiments.

FIG. 4B depicts a front view 401 of a collapsible non-dischargeable video capture gun in an open position and having an empty smartphone housing embodied therein in accordance with described embodiments. Here, the smartphone has not yet been provisioned, and as such, the interior portion of the housing for the smartphone 440 may be observed. For instance, it can be seen the interior of the faux gun barrels as well as the trigger 415 mechanism on the opposing side of the smart phone housing which consumes approximately half of the width of the apparatus such that when the smart phone is provisioned into the smart phone housing 440 the trigger 415 mechanism and the provisioned smartphone do not mechanically interfere with one another. Additionally depicted here are the grip 420 in an opened position and antenna and transceiver 435. Biometric sensor 445 is depicted upon the grip and the rear camera 475 may be observed on the back side of the antenna's mount.

Figure 4C:
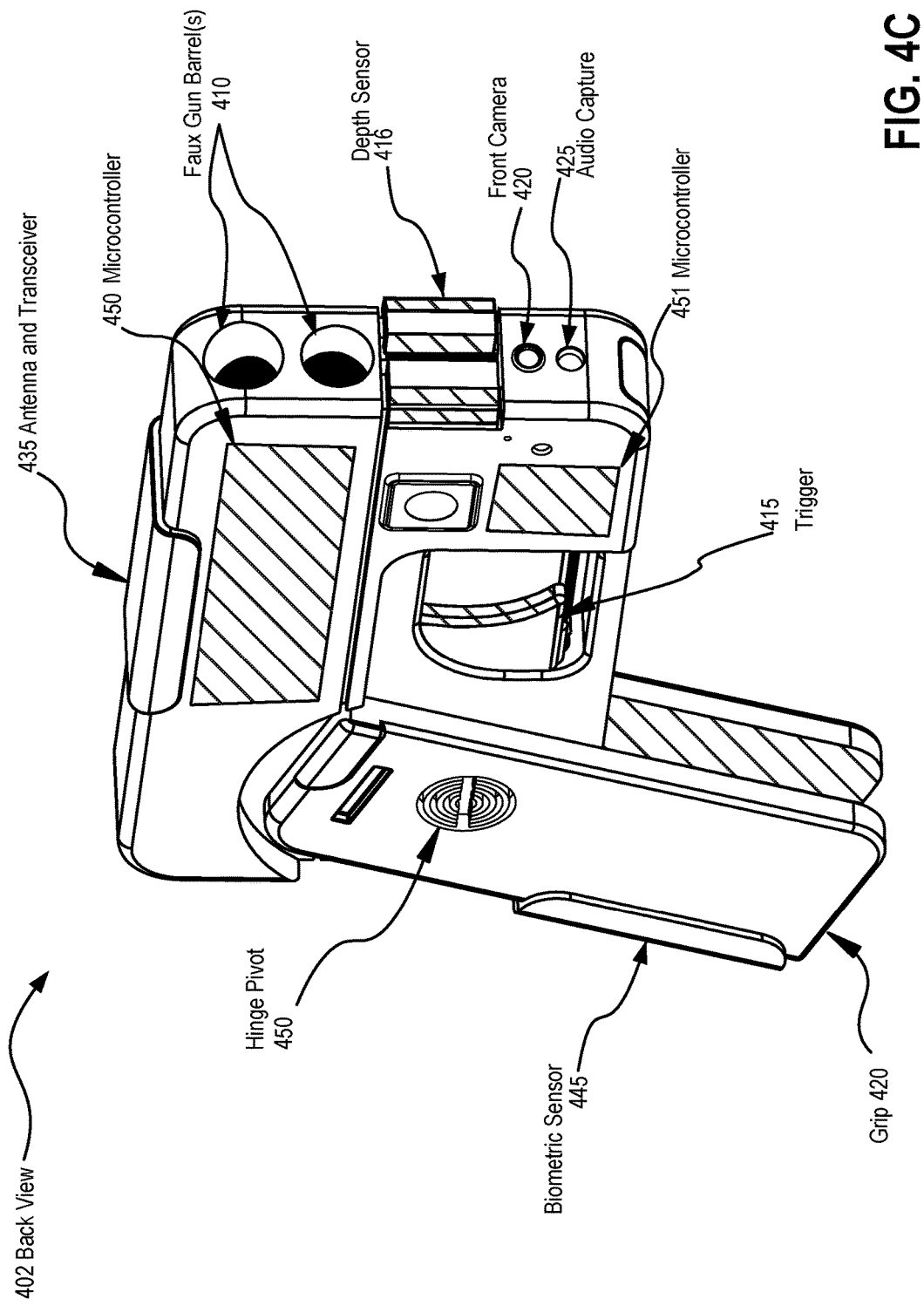
FIG. 4C depicts a back view of a collapsible non-dischargeable video capture gun in an open position and having a smartphone housing embodied therein in accordance with described embodiments.

FIG. 4C depicts a back view 402 of a collapsible non-dischargeable video capture gun in an open position and having a smartphone housing embodied therein in accordance with described embodiments. Here the smartphone is not yet provisioned into the smart phone housing on the opposing side of the apparatus as it may be observed that the opening formed by opening around the trigger 465 is not blocked by the backside of such a provisioned smartphone.

Further depicted here is hinge pivot 450 permitting the grip 420 of the apparatus to open and close, the biometric sensor 445, the trigger 465, the antenna and transceiver 435, faux gun barrels 410, depth sensor 416, front camera 420, audio capture 425 device and microcontrollers 450 and 451.

For instance, such microcontrollers may include at least a memory and processor to perform and carry out operations and execute stored instructions in accordance with the described embodiments. For example, such processing may include capturing and storing audio and video streams and causing the antenna and transceiver to transmit audio and video streams or stored audio and video data to a remote location, such as a cloud computing service or cloud based data storage facility.

Figure 5A:
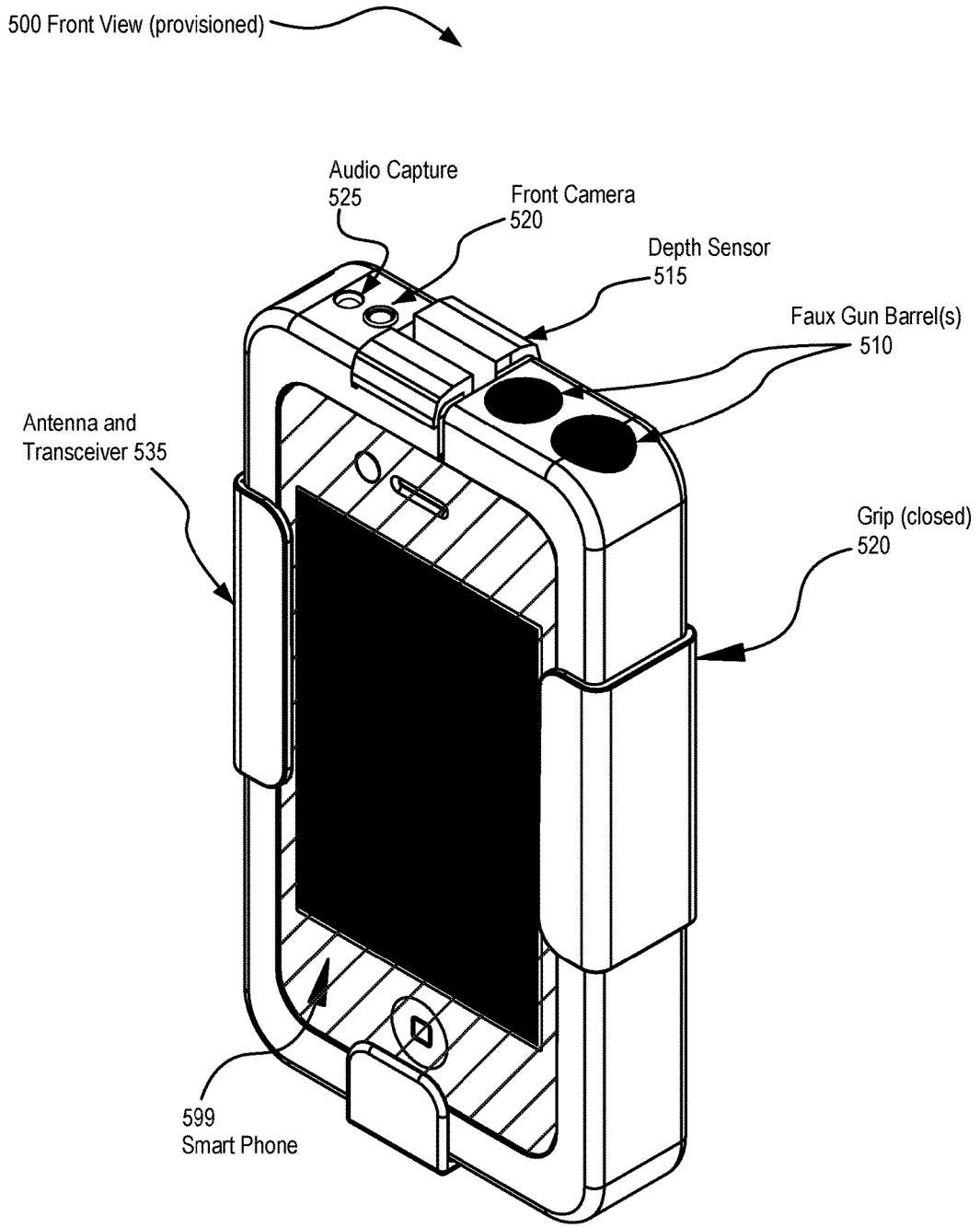
FIG. 5A depicts a front view of a collapsible non-dischargeable video capture gun in a closed position and having a smartphone housing provisioned therein in accordance with described embodiments.

FIG. 5A depicts a front view 500 of a collapsible non-dischargeable video capture gun in a closed position and having a smartphone housing provisioned therein in accordance with described embodiments. As noted previously, the non-dischargeable video capture gun may be opened and closed, so as to take an open form or a collapsed form as described. Here, the smartphone 599 is provisioned and encased within the smartphone housing of the non-dischargeable video capture gun apparatus. It may be observed upon the apparatus the previously described components including, for instance, audio capture 525 device, front camera 520, depth sensor 515, faux gun barrels 510, and the antenna and transceiver 535. The closed grip 520 may additionally be observed on the bottom side of the apparatus.

Figure 5B:
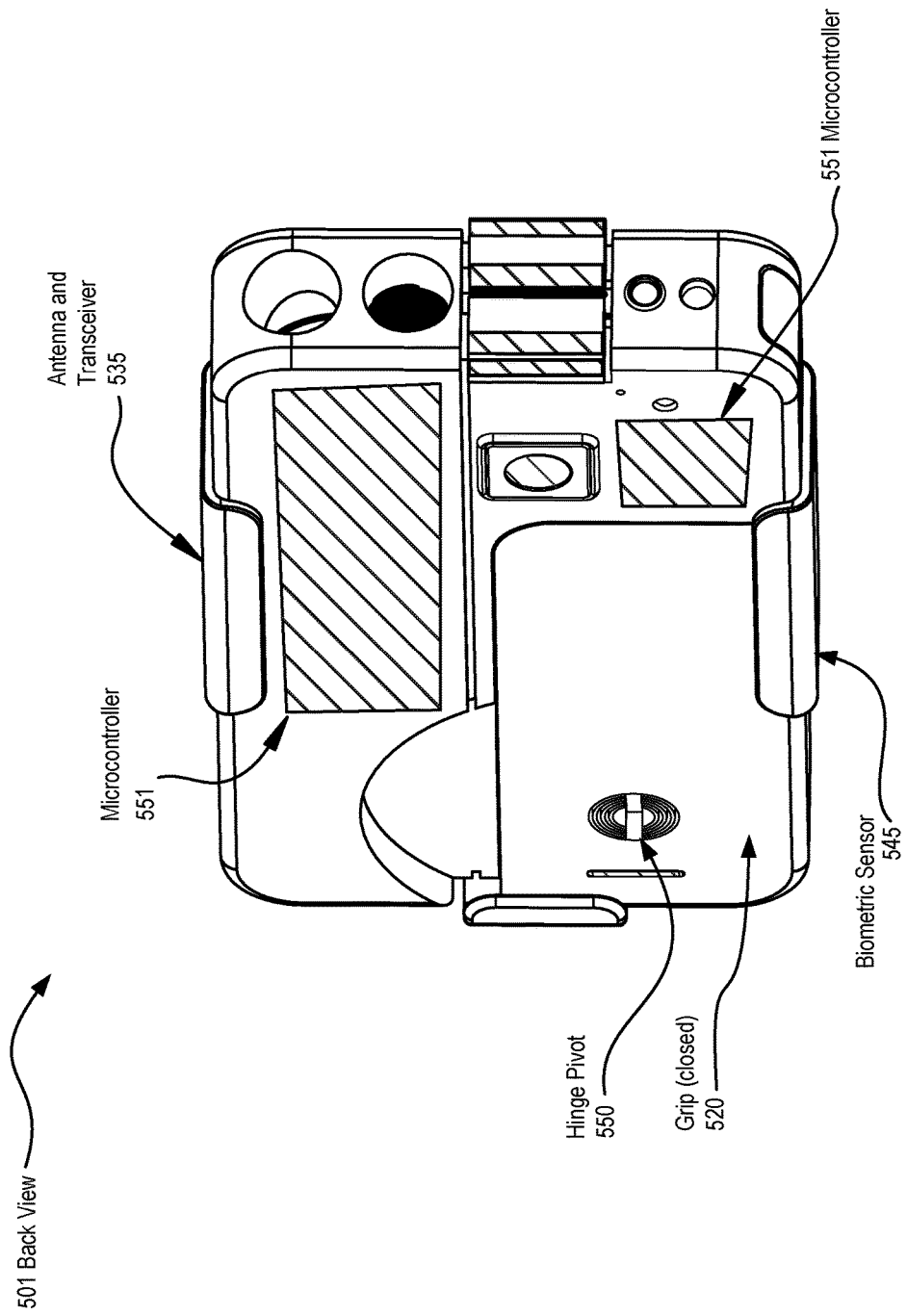
FIG. 5B depicts a back view of a collapsible non-dischargeable video capture gun in a closed position and having a smartphone housing provisioned therein in accordance with described embodiments.

FIG. 5B depicts a back view 501 of a collapsible non-dischargeable video capture gun in a closed position and having a smartphone housing provisioned therein in accordance with described embodiments. The smart phone housing cannot be seen as it is embodied within the opposing side of the apparatus and the space formed by the opening for the trigger mechanism is covered by the closed grip 520. Hinge pivot 550 is shown as are the biometric sensor 545 and microcontrollers 551 and 552.

Figure 5C:
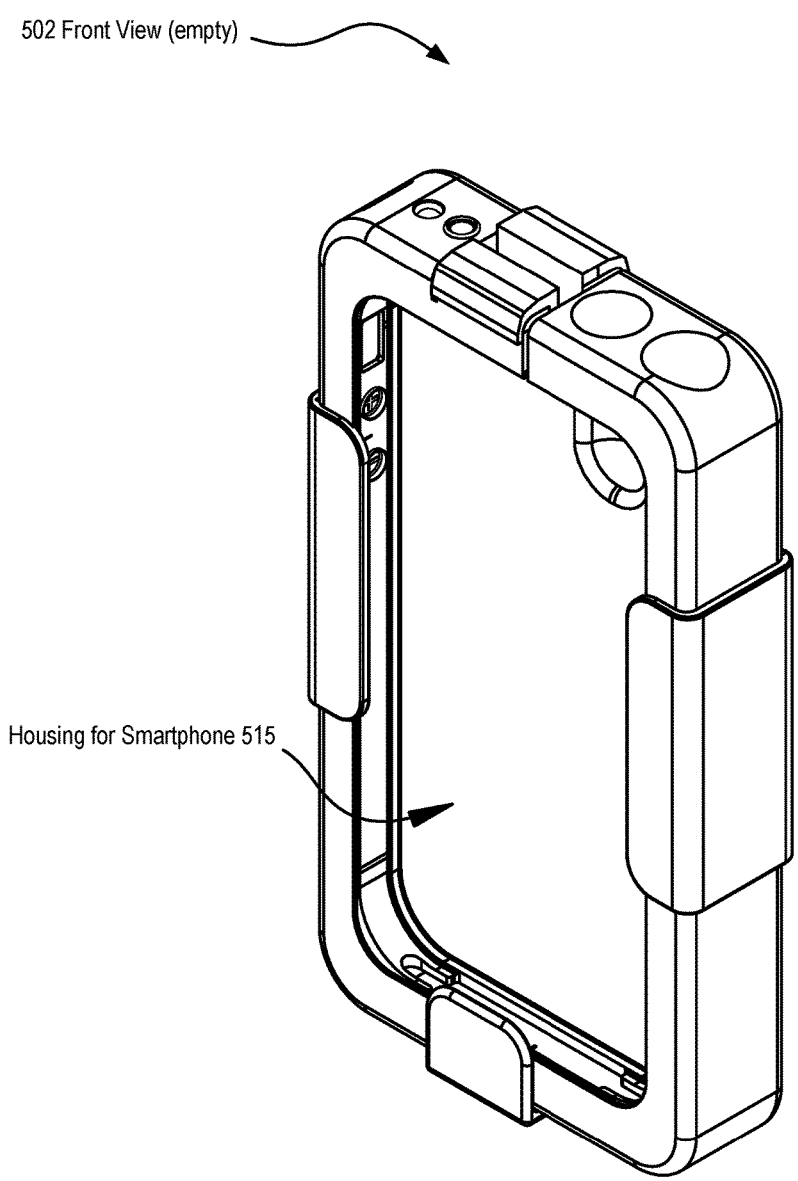
FIG. 5C depicts an alternative front view of a collapsible non-dischargeable video capture gun in a closed position and having an empty smartphone housing embodied therein in accordance with described embodiments.

FIG. 5C depicts an alternative front view 502 of a collapsible non-dischargeable video capture gun in a closed position and having an empty smartphone housing embodied therein in accordance with described embodiments. As depicted here, the smart phone housing 515 includes a backing plate thus closing off the space from the trigger mechanism and opening on the opposing side of the apparatus.

Figure 6:
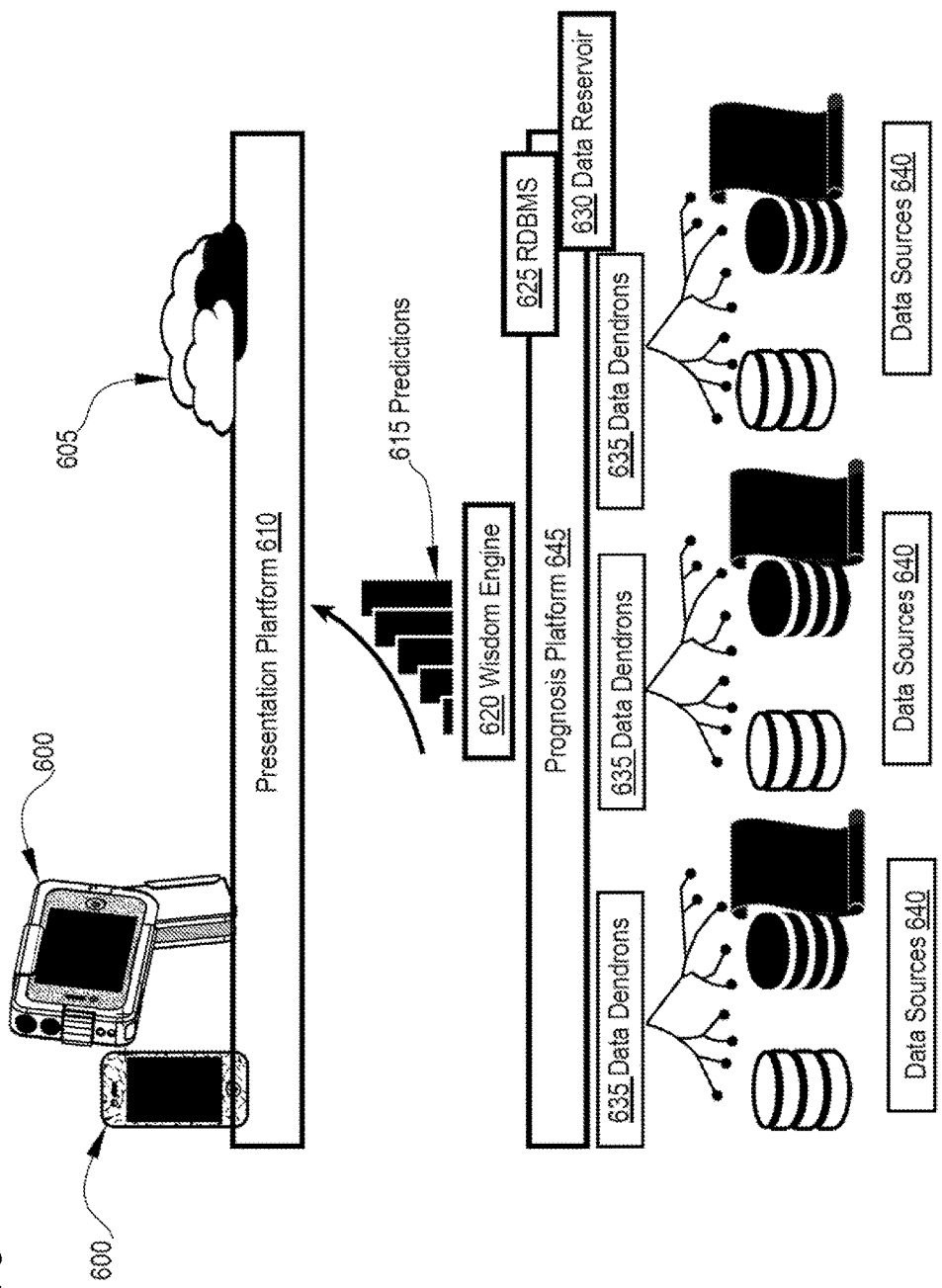
FIG. 6 depicts an exemplary architecture in accordance with described embodiments.

FIG. 6 depicts an exemplary architecture in accordance with described embodiments. For instance, as can be seen apparatuses 600 communicate with a cloud computing architecture 605 over a network. According to certain embodiments, presentation platform 610 interfaces with the cloud computing architecture 605 to exchange data, information, audio, video, telemetry, etc., between the described apparatuses and other information consumers connected with the cloud computing architecture 605. For instance, presentation platform 610 may interface to a wisdom engine 620 which provides data analytics and provides probability based predictions based on available data. Prognosis platform 645 is further depicted which operates in conjunction with an RDBMS 625 and/or data reservoir 630 or other database and data storage architecture. Prognosis platform is further interfaced to multiple data sources 640 via data dendrons 635 as shown.

According to certain embodiments, audio streams, video streams, and other telemetry data originating from apparatuses 600 is stored by the cloud computing architecture 605 and available to the prognosis platform 645 and wisdom engine 620 as one of or a subset of one of the data sources 640. For instance, data originating from the non-dischargeable video capture gun apparatuses as described herein may be stored by the cloud computing architecture 605 and subjected to further analysis in support of rendering predictions.

In accordance with certain embodiments, audio and video streams are transmitted to a cloud computing architecture 605 and replicated, copied, or forwarded to law enforcement agencies, such as a justice department, local, state, or federal law enforcement agencies, etc. Such data may then be utilized as evidence, utilized for training purposes, or utilized in support of conducting statistical analysis of interest to such agencies.

According to certain embodiments, presentation platform 610 integrates with law enforcement agency systems so as to provide data, predictions, evidence, and expose analytical tools provided by the presentation platform via wisdom engine 620, to the law enforcement agencies. Such services may be provided as a subscription model or as a cloud based service to such agencies.

According to certain embodiments, cloud computing architecture 605 aggregates risk data from multiple sources including from apparatuses streaming and transmitting data to cloud computing architecture 605 for storage and initiates outgoing alerts to users of such apparatuses as well as other users subscribing to such a service. For instance, cloud computing architecture 605 may analyze data and push out notifications to users of such apparatuses 600 when entering a geographical area assessed to be above a given risk threshold. In certain embodiments such notifications are user configurable. In other embodiments, the cloud computing architecture 605 determines a risk threshold and pushes notifications to users near or entering such an area. Such risk determinations may be dynamic based on time of day, active or current incident reporting within a geographical area, a quantity of time since risk associated incident reporting occurred for other users, historical risk incident reporting, etc. Incidents may further be based on subscriptions of the cloud computing architecture 605 to other sources, such as police databases and notifications providing risk assessments for various geographic areas.

For instance, users subscribing to a public safety alert system through an app or other mechanism may thus receive alerts which are based at least in part on information collected via such non-dischargeable video capture gun apparatuses, regardless of whether those users carry such an apparatus themselves.

According to a particular embodiment, the non-dischargeable video capture gun apparatus 600 communicates with a user's smartphone via Bluetooth and utilizes the user's smartphone to interface with the cloud computing architecture 605 via a cellular or other wireless network. In other embodiments the apparatus includes a cellular (e.g., 3G, 4G, LTE, etc.) transceiver and communicates with cloud computing architecture 605 via an embedded transmitter or transceiver and optionally utilizes the cellular communication capabilities of the user's smartphone as a backup or redundancy path to the cloud computing architecture 605.

According to certain embodiments, the cloud computing architecture 605 aggregates data and publishes updates to publically accessible mapping services. For instance, the cloud computing architecture 605 may publish incident locations and danger locations to the mapping service for consumption by subscribers to the mapping service. Such published locations may indicate a type or severity of incident based on whether the incident is active and ongoing, time since the incident occurred, severity of the incident, etc.

According to certain embodiments the presentation platform 610 of the cloud computing architecture 605 provides statistical analysis and publishes predictions 615 to law enforcement entities. Such law enforcement entities may utilize such data to perform proactive policing and enforcement in areas determined to have a statistically higher incidence of crime rather than reactively waiting for such incidents to occur.

For instance, an IDPSM or "IoT Driven Personal Safety Management" System or "IDPSM system analytics tool" of the cloud computing architecture 605 may generate pattern and forewarning notifications based on predicted safety concerns. Such notifications may then be utilized to strategically locate and re-deploy idled or underused public safety officers in order to minimize reaction time.

According to certain embodiments, human intervention is required before a police dispatch is requested by the cloud computing architecture 605 responsive to receiving an alert from the apparatus 600. In other embodiments, the apparatus 600 requests a police dispatch and the cloud computing architecture 605 responsively receives and passes or communicates the requested police dispatch to an appropriate law enforcement agency based on geographic location of the apparatus 600 and based on criticality of the incident associated with the alert.

In alternative embodiments, the cloud computing architecture 605 requests a police dispatch automatically and without human intervention based on one or more of statistical analysis of the incoming telemetry data from the apparatus 600, based on a criticality flag passed with the alert from the apparatus 600, or based on automated object recognition performed by the cloud computing architecture 605. For instance, according to certain embodiments, when a live stream is received from the apparatus 600, the video frames are analyzed by cloud computing architecture 605 for known threat objects, such as a firearm, knife, rifle, shotgun, or other weapon. Audio streams received may likewise be analyzed for threat events, such as gunshots or selective terms, phrases, or words captured in conjunction with the event triggered by the apparatus 600 and other available data including, for instance, the criticality of the alert received.

In accordance with certain embodiments, the non-dischargeable video capture gun apparatuses 600 form part of the Internet of Things or "IoT" and engage in machine to machine communications between such apparatuses 600 and the cloud computing architecture 605.

For instance, the apparatuses 600 may communicate with and share information with as well as retrieve information from the cloud computing architecture 605. In accordance with certain embodiments, IoT communications between the apparatuses 600 and the cloud computing architecture 605 are regulated according to a criticality flag. According to other embodiments, the apparatuses 600 must self authenticate with the cloud computing architecture 605 prior to sending or receiving information as part of IoT communications.

According to a particular embodiment, authentication by the apparatuses 600 with the cloud computing architecture 605 requires correctly passing a compliance check bit or a security check bit via the network to the cloud computing architecture 605 when demanded or prior to engaging in IoT communications.

According to certain embodiments, return of a compliance check bit or a security check bit to the cloud computing architecture 605 from the apparatuses incorporates one or more of GPS location data of the apparatus 600, User identifier of the apparatus 600, device identifier of the apparatus 600, or a time stamp from the apparatus 600.

According to particular embodiments, the apparatus 600 embodies an IoT Driven Personal Safety Management system or "IDPSM" system. For instance, the apparatus may appear as an authentic firearm, yet record audio, video, and other telemetry data rather than fire ammunition. According to such embodiments, the apparatus 600 engages in IoT communications with a cloud computing architecture 605 to facilitate personal safety and personal protection of a user. Such IoT communications include capturing and caching live audio and video streams and transmitting the live audio and video stream to the cloud computing architecture 605. The cloud computing architecture 605 may then in turn relay or forward or simply provide for retrieval the live audio and video stream to public safety entities, such as a police department. In one embodiment police department systems are integrated or connected with the presentation platform 610 of the cloud computing architecture 605 and utilize a GUI interface to retrieve and view the live audio and video stream whereas in other embodiments, a URL or other resource locator is provided to the police with a dispatch request and optionally with a criticality flag.

Figure 7:
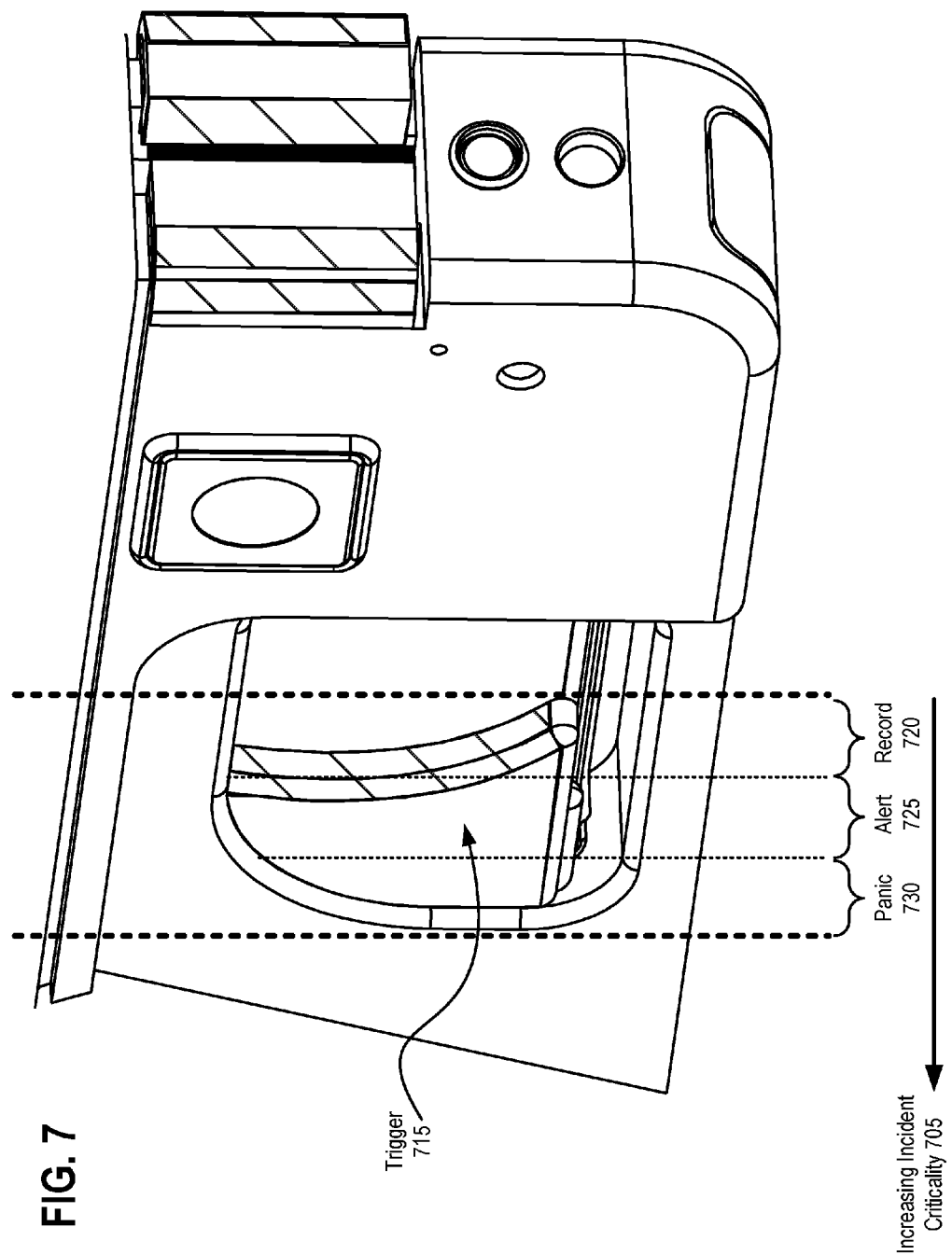
FIG. 7 depicts a trigger mechanism of a non-dischargeable video capture gun apparatus having dynamic response means in accordance with described embodiments.

FIG. 7 depicts a trigger 715 mechanism of a non-dischargeable video capture gun apparatus having dynamic response means in accordance with described embodiments. For instance, according to described embodiments, the trigger 715 may be configured to dynamically respond differently according to increasing incident criticality 705. For example, according to one embodiment, with increasing trigger 715 pull or increasing pressure, the determined criticality increases and the apparatus initiates increasingly heightened safety measures for the user. In one such embodiment, simply pressing or touching the trigger will initiate device recording, such as causing the apparatus to begin capturing audio and video streams from the audio capture device(s) and from its front, back, and side cameras. For example, there may be a "record" 720 zone in which a slight or minimal trigger pull within a threshold distance or range will cause the device to begin recording and capturing audio, video, and other telemetry on behalf of the user. Such a "record" 720 mode may additionally cause the apparatus to transmit the audio, video, and telemetry data to a cloud based repository, such as cloud computing architecture 605 as depicted at FIG. 6.

According to a particular embodiment, a criticality flag is additionally communicated with the audio, video, and telemetry data originating from the apparatus. The cloud computing architecture 605 may analyze such a criticality flag to determine a responsive action to the incoming data, such as storing, storing and forwarding, storing, forwarding, and alerting other entities, and so forth.

Further depicted is "alert" 725 mode which may be dynamically activated on behalf of a user that pulls or presses upon the trigger 715 mechanism within a second threshold range, such as more than a minimal or base threshold below which only record 720 mode is activated but less than a full trigger pull which will initiate the "panic" 730 mode as depicted.

For example, alert 725 mode may cause the recordation of the audio, video, and other telemetry as well as transmission of such data to the cloud computing architecture 605 but additionally initiate an automated police dispatch. For example, a criticality flag may be passed or communicated with the data transmitted to the cloud computing architecture 605 which indicates a heightened incident criticality requesting a police officer dispatch on a non-urgent basis or according to other defined incident response levels established for the local public safety authorities and the cloud computing architecture 605 triggering such a request.

Another incident criticality level is further depicted as the "panic" 730 mode in which a user executing a full trigger 715 pull or a trigger pressure in excess of a threshold amount will initiate a highest priority request for help, thus causing the apparatus to record and transmit audio, video, and telemetry data with a maximum priority criticality flag requesting the cloud computing architecture 605 to immediately summon police or other public safety officials with urgency.

According to such embodiments, activation of the apparatus via the trigger 715 mechanism initiates recording of the audio, video, and telemetry and streams such data to the cloud computing architecture 605 making it available to public safety officials in real-time or near real time who may then further assess the active live stream originating from the apparatus to triage and assess whether or not police officers are dispatched.

Moreover, if a crime is committed, the audio/video stream and telemetry data streamed and archived via cloud computing architecture 605 may then be utilized as evidence for purposes of criminal prosecution and/or exoneration by providing a true and accurate accounting of the incident in question.

Even if a potential assailant is masked, substantial evidence is still collected via the cameras and other sensors, such as the precise timing of events, GPS coordinates, approximate height, weight, and build of the assailant, potentially voice data and other environmental audible evidence, escape path of the assailant, and so forth. Such information is collected by the apparatus and streamed in real-time through the cloud computing architecture 605 to appropriate law enforcement agencies that are then enabled to act more quickly due to the high quality evidentiary data.

According to particular embodiments, the degree to which the trigger is pulled affects the ability for data to be altered or removed from the apparatus. For instance, the apparatus may be configured in such a way that activating "record" mode 720 with a minimal trigger pull will cause the apparatus to capture and record/cache audio, video, and telemetry data locally but not upload such data to the cloud computing architecture 605. In such a mode, the captured data may then be manually set for upload to the cloud computing architecture 605 or may be deleted by the user, etc. However, if the "panic" 730 mode is activated due to a full trigger pull or other similar assessment of the trigger 715 mechanism, then the apparatus may be configured in such a way to record and immediately live stream the audio/video/telemetry data to the cloud computing architecture 605 as well as mark the data cashed or stored on the apparatus for content protections such that it cannot be deleted by a local user, for instance, in the event the apparatus falls into the hands of the assailant or another malicious party.

In such a way, a person seeking increased personal safety but not wishing to carry a firearm may provide an increased level of self protection through the deterrent element of the apparatus which may be made to appear as a realistic and authentic firearm to a would be assailant and further provide increased self-protection through the ability to immediately request police assistance if appropriate as well as capture crucial evidence should a crime actually be committed or attempted.

In accordance with a particular embodiment, the apparatus automatically generates and uploads an alert to the cloud computing architecture 605. According to certain embodiments, the alert is a criticality flag which is utilized to determine at the cloud computing architecture 605 what response to take upon receipt of such an alert from the apparatus. According to certain embodiments, the alert is generated automatically by the apparatus responsive to a sensor other than the trigger. For instance, biometric sensor readings may be utilized to trigger an alert. Audio data, video data, GPS data, depth sensor data, or some combination thereof may be utilized to generate an alert. According to certain embodiments, an alert is automatically generated and transmitted to the cloud computing architecture 605 responsive to a trigger 715 pull and the alert is prioritized according to sensor data including the degree of trigger pull in combination with other sensor data including biometric data, audio, video, depth, GPS, and other available telemetry.

According to certain embodiments, the cloud computing architecture 605 performs statistical analysis of incoming audio, video, and other telemetry data to prioritize incoming alerts. Prioritization may be based on incoming data from a single apparatus or based on incoming data aggregated from multiple such apparatuses transmitting data to the cloud computing architecture 605. According to certain embodiments, the prioritization of the incoming alert is then utilized to determine whether or not a police dispatch is requested and if so, with what urgency. According to certain embodiments, a criticality flag is applied to the alert or updated by the cloud computing architecture 605 before the alert is forwarded to police or other public safety entities. According to certain embodiments, an alert generated by such an apparatus is received by cloud computing architecture 605 and then transmitted to a remote public safety entity with a criticality flag and with a live audio and video stream originating from the apparatus and passed through the cloud computing architecture 605.

According to a particular embodiment, once a live stream of audio and video is dispatched and retrieved by a police officer accepting the case assignment, the same live stream of audio and video cannot be retrieved by another police officer. In a related embodiment, police officers on-scene at or near the location associated with the originating live stream of audio and video from the apparatus may also retrieve the live stream of audio and video. In yet other embodiments, access is role based, for instance, detectives may retrieve archived footage but patrol officers may not.

Figure 8:
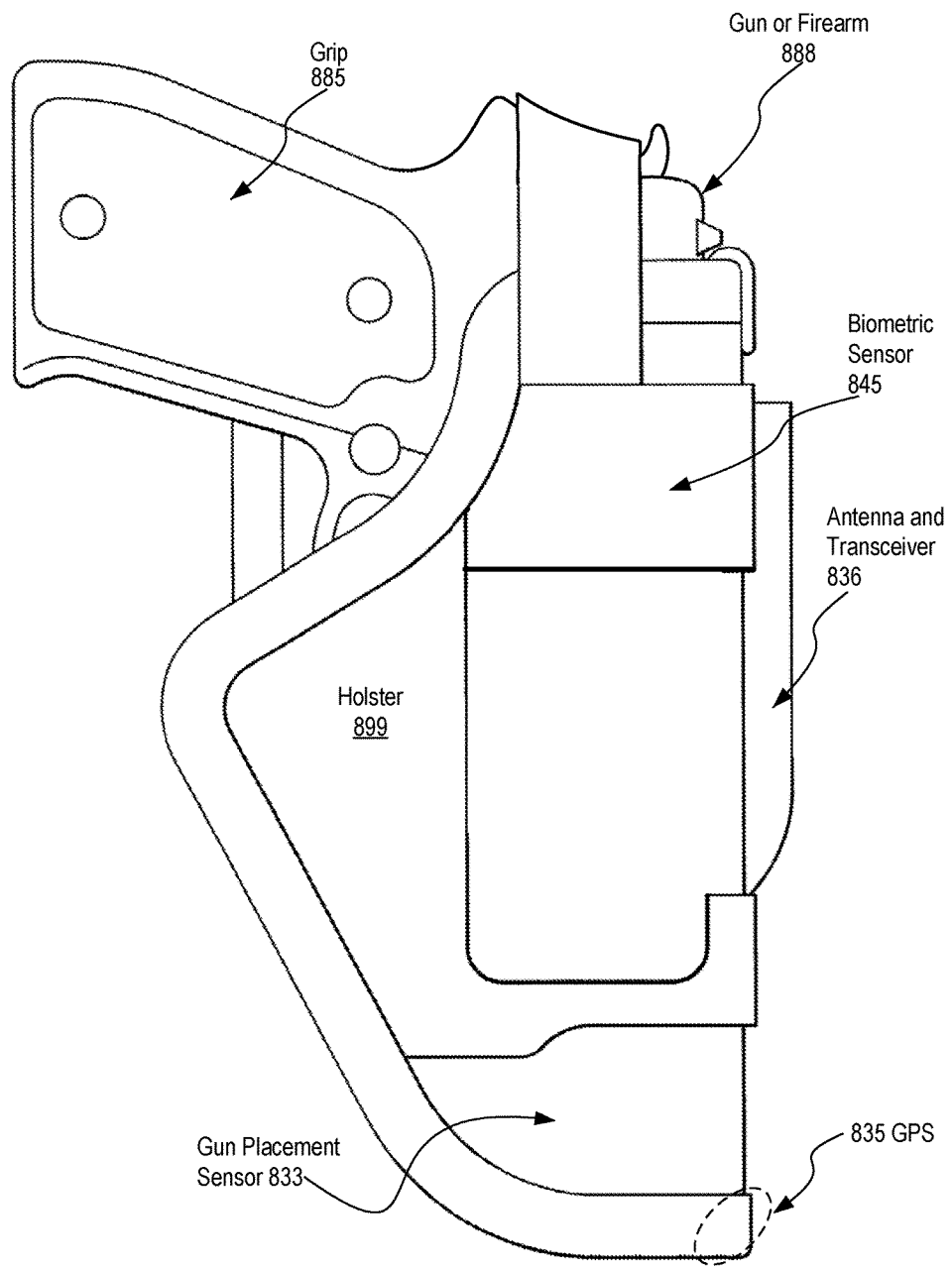
FIG. 8 depicts gun holster for a firearm having an antenna and transceiver equipped thereupon in accordance with described embodiments.

FIG. 8 depicts gun holster 899 for a firearm having an antenna and transceiver 836 equipped thereupon in accordance with described embodiments. Further depicted is a gun 888 within the holster. Notably, the gun 888 is an actual firearm capable of firing live ammunition. The holster 899 an/or optionally the grip 885, may embody any of the sensors described above, for instance, as depicted there is a GPS sensor 835 as well as a biometric sensor 845 capable of reading and capturing fingerprints as well as additional biometric telemetry data from a user.

According to the described embodiments, the non-dischargeable video capture gun apparatus may be utilized with both personal and also public Safety Management Applications. As depicted, the IoT communications, alerts, and capabilities described above for the non-dischargeable video capture gun apparatus may be extended to Public Safety purposes as well, including for use by public safety officers including police officers and other on-duty law enforcement personnel. As depicted here, a holster is equipped with the antenna and transceiver 836 capable to engage in IoT communications with the cloud computing architecture 605. The holster 899 may communicate with a body camera worn by a police officer capable of capturing audio and video and the holster 899 may relay such information to the cloud computing architecture 605. In such a way, the cloud computing architecture 605 records incidences for the law enforcement officers when such a police officer is on duty in accordance with described embodiments.

According to described embodiments, a gun placement sensor 833 detects whether the police officer's firearm is holstered at any given time. According to such embodiments, removal of the gun 888 from the holster 899 automatically activates a body cam worn by the police officer, for instance, causing audio and video streams to be captured by the body camera. The streams may be communicated to the holster via, for example, Bluetooth or other personal connectivity network, and then relayed to the cloud computing architecture 605 via cellular or other wireless communications. In other embodiments, removal of the gun from the holster automatically activates recording by the police officer's body camera and the body camera having its own transceiver and antenna may then communicate the live audio and video streams to the cloud computing architecture 605 without relaying such data to the holster apparatus. The gun placement sensor 833 may be a contact switch or other sensor capable of determining whether the gun is holstered and activating the body camera upon the removal of the gun from the holster.

Figure 9:
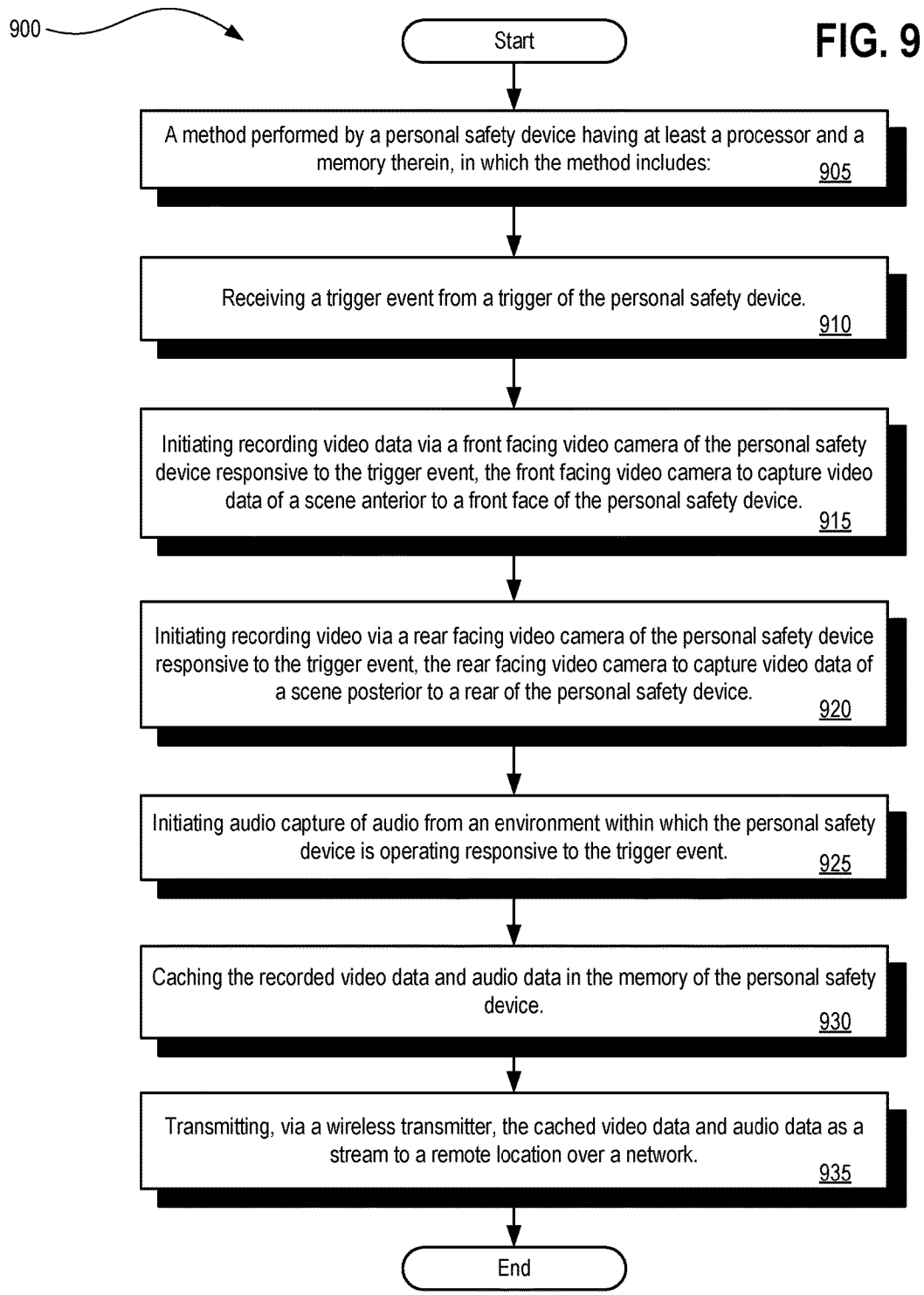
FIG. 9 is a flow diagram illustrating a method for implementing video shooting guns and personal safety management applications in accordance with disclosed embodiments.

FIG. 9 is a flow diagram illustrating a method 900 for implementing video shooting guns and personal safety management applications in accordance with disclosed embodiments. Method 900 may be performed by processing logic that may include hardware (e.g., circuitry, dedicated logic, programmable logic, microcode, etc.), software (e.g., instructions run on a processing device) to perform various operations such as storing records, processing, executing, providing, determining, receiving, initiating, caching, transmitting, sending, returning, etc., in pursuance of the systems and methods as described herein. For example, an apparatus embodying a personal safety device as depicted at FIGS. 1 through 5 may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 905, the flow diagram begins with a method performed by a personal safety device having at least a processor and a memory therein.

At block 910, processing logic receives a trigger event from a trigger of the personal safety device.

At block 915, processing logic initiates recording video data via a front facing video camera of the personal safety device responsive to the trigger event, the front facing video camera to capture video data of a scene anterior to a front face of the personal safety device.

At block 920, processing logic initiates recording video via a rear facing video camera of the personal safety device responsive to the trigger event, the rear facing video camera to capture video data of a scene posterior to a rear of the personal safety device.

At block 925, processing logic initiates audio capture of audio from an environment within which the personal safety device is operating responsive to the trigger event.

At block 930, processing logic caches the recorded video data and audio data in the memory of the personal safety device.

At block 935, processing logic transmits, via a wireless transmitter, the cached video data and audio data as a stream to a remote location over a network.

According to another embodiment of method 900, the personal safety device further includes a GPS sensor; a time module; a cache within the memory of the personal safety device; and in which the trigger when triggered by the operator of the personal safety device causes the memory to receive GPS data from the GPS sensor, to receive a time stamp from the time module, and to receive the video data from the front and rear cameras and the audio data from the audio capture device.

According to another embodiment of method 900, the personal safety device further includes: a data store; in which the trigger when triggered by the operator of the personal safety device causes the cache of the memory to persistently store the cached video data from the front and rear cameras and the audio data from the audio capture device in the data store and to transmit the cached video data from the front and rear cameras and the audio data from the audio capture device to the remote location over the network.

According to another embodiment of method 900, the transceiver to transmit the recorded video data from the front and rear cameras and the captured audio data to a remote location over a network includes the transceiver to transmit the recorded video data from the front and rear cameras and the captured audio data as a live data stream from the memory of the personal safety device to a cloud computing repository over a public Internet via one of: a 3G cellular wireless connection; a 4G cellular wireless connection; an LTE cellular wireless connection; a GSM cellular wireless connection; a CDMA cellular wireless connection or via a WiFi wireless connection.

According to another embodiment of method 900, the trigger to initiate recording of the front facing video camera, the rear facing video camera, and the audio capture device when triggered by an operator of the personal safety device includes: a mechanical gun trigger to be triggered by the operator via an affirmative physical action of the operator of the personal safety device.

According to another embodiment of method 900, the trigger includes one of: a gun trigger; a mechanical trigger; a push button; a pressure sensitive trigger; and in which the trigger to initiate different events based on a distance an operator of the personal safety device pulls the trigger or based on a pressure exerted upon the trigger by the operator of the personal safety device.

According to another embodiment of method 900, the trigger to initiate different actions includes the trigger to initiate one the following three events based on the distance the operator pulls the trigger based on the pressure exerted upon the trigger by the operator: (i) the trigger to initiate a record mode event when the operator pulls the trigger a first distance or with a first pressure, in which the record mode is to record and store locally the video data from the front and rear cameras and the audio data from the audio capture device and to transmit the recorded video data and audio data to a cloud based repository for personal use without relaying the transmitted video data and audio data from the cloud based repository to any public safety or law enforcement entity; (ii) the trigger to initiate an alert mode event when the operator pulls the trigger a second distance greater than the first distance or with a second pressure greater than the first pressure, in which the alert mode is to record and store locally the video data from the front and rear cameras and the audio data from the audio capture device and to transmit the recorded video data and audio data to the cloud based repository with an alert to communicate the transmitted video data and audio data from the cloud based repository to a public safety or law enforcement entity; (iii) the trigger to initiate a panic mode event when the operator pulls the trigger a third distance greater than the first and second distances or with a third pressure greater than the first and second pressures, in which the panic mode is to record and store locally the video data from the front and rear cameras and the audio data from the audio capture device and to transmit the recorded video data and audio data to the cloud based repository with an alert to communicate the transmitted video data and audio data from the cloud based repository to a public safety or law enforcement entity and with a criticality flag requesting urgent dispatch of police to the location of the personal safety device.

According to another embodiment of method 900, the trigger further causes the personal safety device to initiate capture of GPS location information, time stamp information, operator identity information, personal safety device identity information, and a criticality level based on the degree of trigger pull by the operator of the personal safety device; and in which the transceiver to transmit the recorded video data from the front and rear cameras and the captured audio data to the remote location over a network includes the transceiver to live stream the video data and the audio data to the remote location with the GPS location information, the time stamp information, the operator identity information, the personal safety device identity information; and a criticality flag based on the criticality level.

According to another embodiment of method 900, the remote location includes a cloud computing architecture providing cloud based services; in which the cloud computing architecture initiates different events based upon the criticality flag received with the streamed video data and the audio data and telemetry data transmitted concurrently therewith; in which the cloud computing architecture triggers a request for police dispatch to a GPS location indicated via the telemetry data received based on a criticality flag received indicating a criticality of an event at the GPS location based on an affirmative action of the operator of the personal safety device.

According to another embodiment of method 900, the remote location includes a cloud computing architecture providing cloud based services; in which the cloud computing architecture initiates different events based upon the streamed video data and the audio data and telemetry data transmitted with the audio and video data stream; in which the cloud computing architecture initiates one or more of the following events: receives and archives the streamed video data and the audio data and telemetry data transmitted; receives and relays the streamed video data and the audio data and telemetry data transmitted to a law enforcement entity; requests non-urgent police dispatch on behalf of the operator of the personal safety device; requests urgent police dispatch on behalf of the operator of the personal safety device; requests police dispatch without human intervention based on the streamed video data and the audio data and telemetry data transmitted; and requests police dispatch subsequent to human intervention and review of the streamed video data and the audio data and telemetry data transmitted.

According to another embodiment of method 900, the remote location includes a cloud computing architecture providing cloud based services; and in which the cloud computing architecture analyzes the streamed video data transmitted to identify, without human intervention, a weapon within the video data captured by the front facing camera; and in which the cloud computing architecture requests urgent police dispatch on behalf of the operator of the personal safety device upon identification of the weapon.

According to another embodiment of method 900, the personal safety device embodies a non-dischargeable video capture gun apparatus having a gun shape defined by at least a gun grip, one or more gun barrels, and gun trigger; and in which the personal safety device does not fire ammunition.

According to another embodiment of method 900, the front facing video camera is to capture video data of a target at which the personal safety device is pointed; in which the rear facing video camera is to capture video data of an operator holding the personal safety device.

According to another embodiment of method 900, wherein the personal safety device further includes: one or more side facing cameras to capture video data of a scene to a lateral left or lateral right of the personal safety device.

In accordance with a particular embodiment, there is non-transitory computer readable storage media having instructions stored thereon that, when executed by a processor of a personal safety device, the instructions cause the personal safety device to perform operations including: receiving a trigger event from a trigger of the personal safety device; initiating recording video data via a front facing video camera of the personal safety device responsive to the trigger event, the front facing video camera to capture video data of a scene anterior to a front face of the personal safety device; initiating recording video via a rear facing video camera of the personal safety device responsive to the trigger event, the rear facing video camera to capture video data of a scene posterior to a rear of the personal safety device; initiating audio capture of audio from an environment within which the personal safety device is operating responsive to the trigger event; caching the recorded video data and audio data in the memory of the personal safety device; and transmitting, via a wireless transmitter, the cached video data and audio data as a stream to a remote location over a network.

Figure 10:
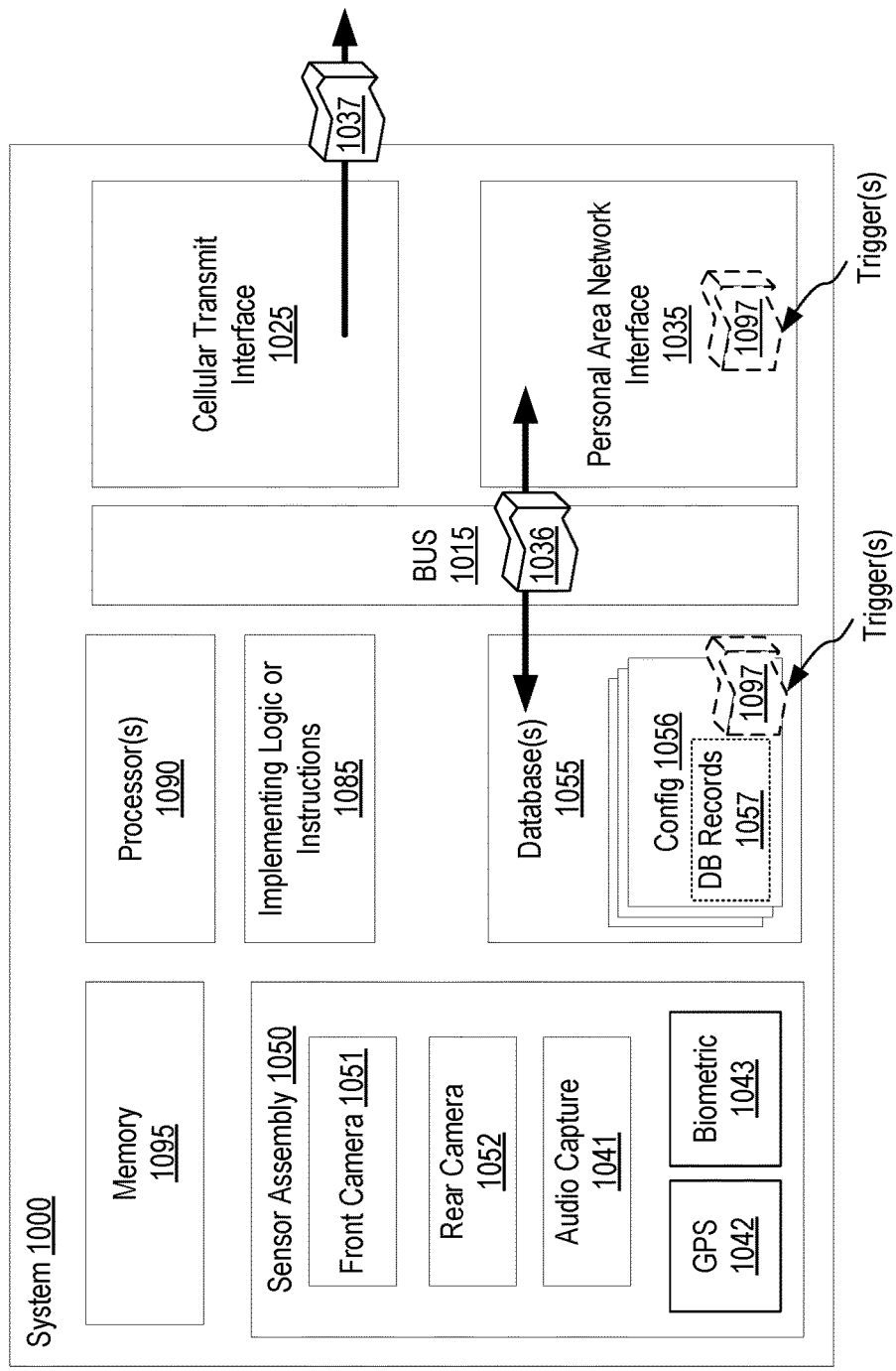
FIG. 10 shows a diagrammatic representation of a system within which embodiments may operate, be installed, integrated, or configured.

FIG. 10 shows a diagrammatic representation of a system 1000 within which embodiments may operate, be installed, integrated, or configured. In accordance with one embodiment, there is a system 1000 having at least a processor 1090 and a memory 1095 therein to execute implementing logic or instructions 1085. Such a system 1000 may communicatively interface with and cooperatively execute with the benefit of a hosted cloud computing environment, such as a cloud computing architecture or a cloud based services provider. For instance, information 1036 may be transacted upon or communicated within such a system 1000 and/or information 1037 communicated to or received from a cloud computing architecture. For example, audio and video streams and telemetry data may constitute information 1036 and 1037 communicated within such a system and to external systems, such as the cloud based service provider, from such a system 1000.

According to the depicted embodiment, the system 1000 includes the processor 1090 and the memory 1095 to execute instructions at the system 1000; a database 1055 to store a plurality of data and objects, such as captured audio and video data as well as telemetry data. Personal Area Network (PAN) interface 1035 connects the system 1000 with other electronic devices, such as a smartphone over Bluetooth or other communication means. Cellular transmit interface 1025 enables the system 1000 to communicate data with remote systems, such as a remote cloud based data repository. Configuration 1056 is depicted to store the various configurations utilized by system 1000 within DB records 1057 along side other information such as the captured audio and video and telemetry data. Triggers 1097 may be defined and stored by the database 1055. Triggers may additionally be passed between a smartphone and the system via, for instance, PAN interface 1035. The sensor assembly 1050 depicts a series of sensors for the system 1000 including, for instance, front camera 1051, rear camera 1052, audio capture 1041 device, GPS 1042 sensor, biometric 1043 sensor. Further utilized may be side cameras, depth sensors, etc.

Bus 1015 interfaces the various components of the system 1000 amongst each other, with any other peripheral(s) of the system 1000, and with external components such as external network elements, other machines, client devices, cloud computing services, etc. Communications may further include communicating with external devices via a network interface over a LAN, WAN, or the public Internet.

In accordance with a particular embodiment there is a personal safety device or system which includes, for example, a processor and a memory to execute instructions; a rechargeable battery to electrically power the personal safety device; a front facing video camera to capture video data of a scene anterior to a front face of the personal safety device; a rear facing video camera to capture video data of a scene posterior to a rear of the personal safety device; an audio capture device to capture audio data from an environment within which the personal safety device is to operate; a trigger to initiate recording of the front facing video camera, the rear facing video camera, and the audio capture device when triggered by an operator of the personal safety device; and a transceiver to transmit the recorded video data from the front and rear cameras and the captured audio data to a remote location over a network.

According to an alternative embodiment there is a public safety system for use by a law enforcement officer, the public safety system including: a gun holster; a gun placement sensor integrated with the gun holster, the gun placement sensor to determine whether a gun of the law enforcement officer is holstered or not holstered; a wireless transceiver integrated with the gun holster, the wireless transceiver to wirelessly communicate with a wearable body camera to be word by the law enforcement officer; the wearable body camera in wireless communication with the gun holster; front facing video camera integrated with the body camera to capture video data of a scene in front of the body camera; an audio capture device integrated with the body camera to capture audio data; in which the gun placement sensor of the holster to initiate recording of the front facing video camera and the audio capture device when the gun is determined to have been removed from the holster; and a cellular transceiver to transmit the recorded video data and the captured audio data to a remote location over a network.

According to one embodiment of the public safety system, the cellular transceiver to transmit the recorded video data and captured audio data to the remote location includes the cellular transceiver to transmit the recorded video data and captured audio data to a law enforcement agency via the remote location.

According to one embodiment of the public safety system, additional police resources are automatically requested for dispatch to a location of the law enforcement officer based on GPS data received with the transmission of the video data and audio data based on the gun being removed from the holster.

Figure 11:
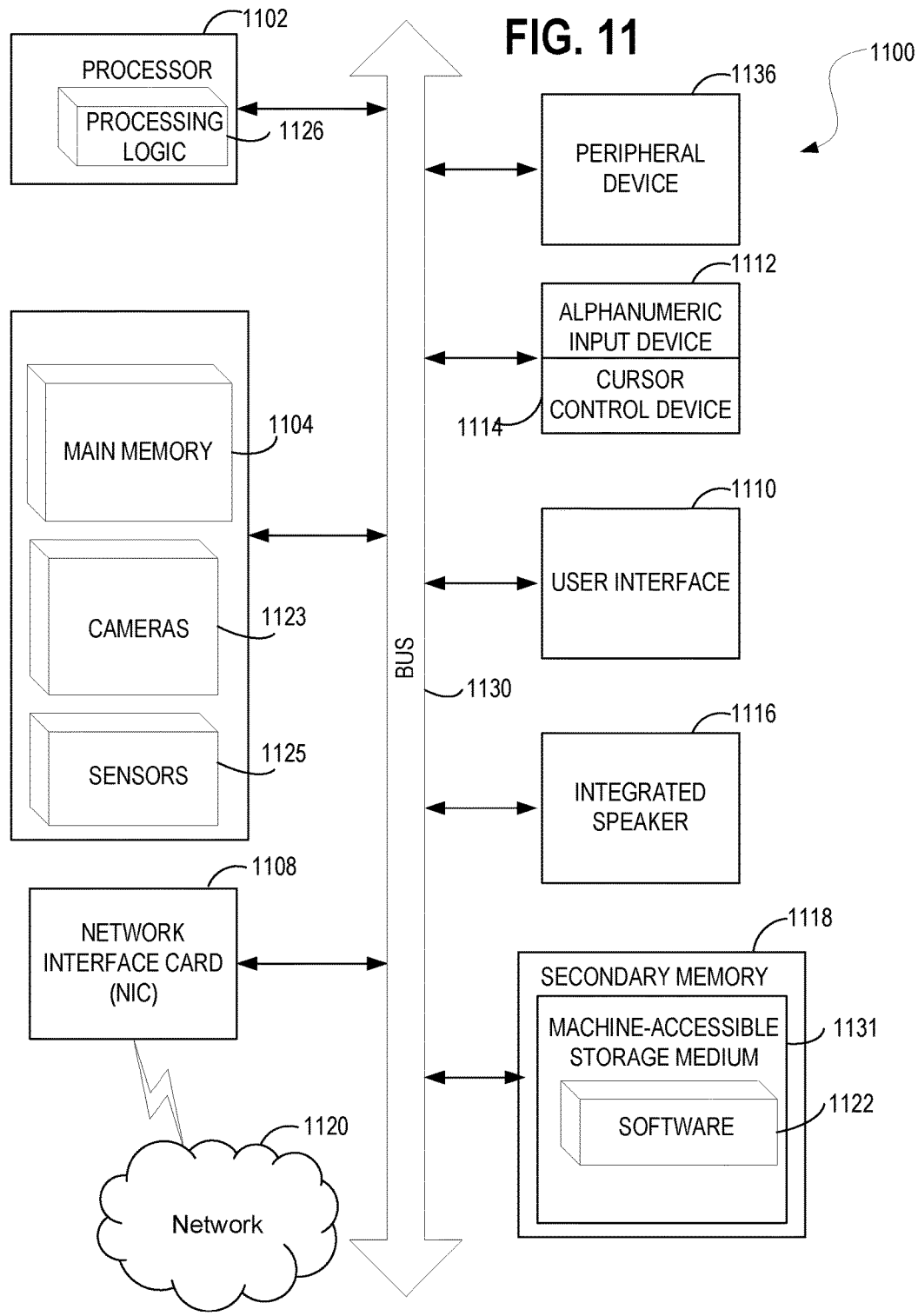
FIG. 11 illustrates a diagrammatic representation of a machine in the exemplary form of a computer system, in accordance with one embodiment.

FIG. 11 illustrates a diagrammatic representation of a machine 1100 in the exemplary form of a computer system, in accordance with one embodiment, within which a set of instructions, for causing the machine/computer system 1100 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1118 (e.g., a persistent storage device including hard disk drives and a persistent database and local data store), which communicate with each other via a bus 1130. Main memory 1104 may include the databases when operating, cache, configuration information, etc. Main memory 1104 and its sub-elements are operable in conjunction with cameras 1123, sensors 1125, processing logic 1126, and processor 1102 to perform the methodologies discussed herein.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and functionality which is discussed herein.

The computer system 1100 may further include a network interface card 1108. The computer system 1100 also may include a user interface 1110 (such as a video display unit, a liquid crystal display, etc.), an alphanumeric input device 1112 (e.g., a keyboard), a cursor control device 1114 (e.g., a mouse), and a signal generation device 1116 (e.g., an integrated speaker). The computer system 1100 may further include peripheral device 1136 (e.g., wireless or wired communication devices, memory devices, storage devices, audio processing devices, video processing devices, etc.).

The secondary memory 1118 may include a non-transitory machine-readable storage medium or a non-transitory computer readable storage medium or a non-transitory machine-accessible storage medium 1131 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the computer system 1100, the main memory 1104 and the processor 1102 also constituting machine-readable storage media. The software 1122 may further be transmitted or received over a network 1120 via the network interface card 1108.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A personal safety device comprising:
   a gun barrel;
   a processor and a memory to execute instructions;
   a rechargeable battery to electrically power the personal safety device;
   a front facing video camera to capture video data of a scene anterior to a front face of the personal safety device including the gun barrel;
   a rear facing video camera to capture video data of a scene posterior to a rear of the personal safety device, wherein the scene posterior to the rear of the personal safety device is not obstructed by the personal safety device including the gun barrel;
   an audio capture device to capture audio data from an environment within which the personal safety device is to operate;
   a trigger to initiate recording of the front facing video camera, the rear facing video camera, and the audio capture device when triggered by an operator of the personal safety device; and
   a transceiver to transmit the recorded video data from the front and rear cameras and the captured audio data to a remote location over a network, and
   wherein the trigger further causes the personal safety device to initiate capture of GPS location information, time stamp information, operator identity information, personal safety device identity information, and a criticality level based on the degree of trigger pull by the operator of the personal safety device, and
   wherein the transceiver is to transmit the recorded video data from the front and rear cameras and the captured audio data to the remote location over the network, the recorded video data and captured audio data including live stream video data and audio data with the GPS location information, the time stamp information, the operator identity information, the personal safety device identity information, and a criticality flag based on the criticality level.

2. The personal safety device of claim 1, further comprising:
   a GPS sensor;
   a time module;
   a cache within the memory of the personal safety device; and
   wherein the trigger when triggered by the operator of the personal safety device causes the memory to receive GPS data from the GPS sensor, to receive a time stamp from the time module, and to receive the video data from the front and rear cameras and the audio data from the audio capture device.

3. The personal safety device of claim 2, further comprising:
   a data store;
   wherein the trigger when triggered by the operator of the personal safety device causes the cache of the memory to persistently store the cached video data from the front and rear cameras and the audio data from the audio capture device in the data store and to transmit the cached video data from the front and rear cameras and the audio data from the audio capture device to the remote location over the network.

4. The personal safety device of claim 1, wherein the transceiver to transmit the recorded video data from the front and rear cameras and the captured audio data to a remote location over a network comprises the transceiver to transmit the recorded video data from the front and rear cameras and the captured audio data as a live data stream from the memory of the personal safety device to a cloud computing repository over a public Internet via one of: a 3G cellular wireless connection; a 4G cellular wireless connection; an LTE cellular wireless connection; a GSM cellular wireless connection; a CDMA cellular wireless connection or via a WiFi wireless connection.

5. The personal safety device of claim 1, wherein the trigger to initiate recording of the front facing video camera, the rear facing video camera, and the audio capture device when triggered by an operator of the personal safety device comprises:
   a mechanical gun trigger to be triggered by the operator via an affirmative physical action of the operator of the personal safety device.

6. The personal safety device of claim 1, wherein the trigger comprises one of:
   a gun trigger;
   a mechanical trigger;
   a push button;
   a pressure sensitive trigger; and
   wherein the trigger to initiate different events based on a distance an operator of the personal safety device pulls the trigger or based on a pressure exerted upon the trigger by the operator of the personal safety device.

7. The personal safety device of claim 6, wherein the trigger to initiate different actions comprises the trigger to initiate one the following three events based on the distance the operator pulls the trigger based on the pressure exerted upon the trigger by the operator:
   (i) the trigger to initiate a record mode event when the operator pulls the trigger a first distance or with a first pressure, wherein the record mode is to record and store locally the video data from the front and rear cameras and the audio data from the audio capture device and to transmit the recorded video data and audio data to a cloud based repository for personal use without relaying the transmitted video data and audio data from the cloud based repository to any public safety or law enforcement entity;
   (ii) the trigger to initiate an alert mode event when the operator pulls the trigger a second distance greater than the first distance or with a second pressure greater than the first pressure, wherein the alert mode is to record and store locally the video data from the front and rear cameras and the audio data from the audio capture device and to transmit the recorded video data and audio data to the cloud based repository with an alert to communicate the transmitted video data and audio data from the cloud based repository to a public safety or law enforcement entity;
   (iii) the trigger to initiate a panic mode event when the operator pulls the trigger a third distance greater than the first and second distances or with a third pressure greater than the first and second pressures, wherein the panic mode is to record and store locally the video data from the front and rear cameras and the audio data from the audio capture device and to transmit the recorded video data and audio data to the cloud based repository with an alert to communicate the transmitted video data and audio data from the cloud based repository to a public safety or law enforcement entity and with a criticality flag requesting urgent dispatch of police to the location of the personal safety device.

8. The personal safety device of claim 1:
wherein the remote location comprises a cloud computing architecture providing cloud based services;
wherein the cloud computing architecture initiates different events based upon the criticality flag received with the streamed video data and the audio data and telemetry data transmitted concurrently therewith;
wherein the cloud computing architecture triggers a request for police dispatch to a GPS location indicated via the telemetry data received based on a criticality flag received indicating a criticality of an event at the GPS location based on an affirmative action of the operator of the personal safety device.

9. The personal safety device of claim 1:
wherein the remote location comprises a cloud computing architecture providing cloud based services;
wherein the cloud computing architecture initiates different events based upon the streamed video data and the audio data and telemetry data transmitted with the audio and video data stream;
wherein the cloud computing architecture initiates one or more of the following events:
receives and archives the streamed video data and the audio data and telemetry data transmitted;
receives and relays the streamed video data and the audio data and telemetry data transmitted to a law enforcement entity;
requests non-urgent police dispatch on behalf of the operator of the personal safety device;
requests urgent police dispatch on behalf of the operator of the personal safety device;
requests police dispatch without human intervention based on the streamed video data and the audio data and telemetry data transmitted; and
requests police dispatch subsequent to human intervention and review of the streamed video data and the audio data and telemetry data transmitted.

10. The personal safety device of claim 1:
wherein the remote location comprises a cloud computing architecture providing cloud based services; and
wherein the cloud computing architecture analyzes the streamed video data transmitted to identify, without human intervention, a weapon within the video data captured by the front facing camera; and
wherein the cloud computing architecture requests urgent police dispatch on behalf of the operator of the personal safety device upon identification of the weapon.

11. The personal safety device of claim 1:
wherein the front facing video camera is to capture video data of a target at which the personal safety device is pointed;
wherein the rear facing video camera is to capture video data of an operator holding the personal safety device.

12. The personal safety device of claim 1, further comprising:
one or more side facing cameras to capture video data of a scene to a lateral left or lateral right of the personal safety device.

13. A method performed by a personal safety device having at least a processor and a memory therein, wherein the method comprises:
receiving a trigger event from a trigger of the personal safety device including a gun barrel;
initiating recording video data via a front facing video camera of the personal safety device responsive to the trigger event, the front facing video camera to capture video data of a scene anterior to a front face of the personal safety device including the gun barrel;
initiating recording video via a rear facing video camera of the personal safety device responsive to the trigger event, the rear facing video camera to capture video data of a scene posterior to a rear of the personal safety device, wherein the scene posterior to the rear of the personal safety device is not obstructed by the personal safety device including the gun barrel;
initiating audio capture of audio from an environment within which the personal safety device is operating responsive to the trigger event;
caching the recorded video data and audio data in the memory of the personal safety device; and
transmitting, via a wireless transmitter, the cached video data and audio data as a stream to a remote location over a network, and
wherein the trigger further causes the personal safety device to initiate capture of GPS location information, time stamp information, operator identity information, personal safety device identity information, and a criticality level based on the degree of trigger pull by the operator of the personal safety device, and
wherein the wireless transmitter is to transmit the recorded video data from the front and rear cameras and the captured audio data to the remote location over the network, the recorded video data and captured audio data including live stream video data and audio data with the GPS location information, the time stamp information, the operator identity information, the personal safety device identity information, and a criticality flag based on the criticality level.

14. The method of claim 13, wherein the personal safety device further comprises:
a GPS sensor;
a time module;
a cache within the memory of the personal safety device;
wherein the trigger event is operator input indicating a trigger pull by an operator of the personal safety device, the trigger pull causing the memory to receive GPS data from the GPS sensor, to receive a time stamp from the time module, and to receive the video data from the front and rear cameras and the audio data from the audio capture device; and
wherein the method further comprises storing, via a data store of the personal safety device, the cached video data from the front and rear cameras and the audio data from the audio capture device.

15. Non-transitory computer readable storage media having instructions stored thereon that, when executed by a processor of a personal safety device, the instructions cause the personal safety device to perform operations including:
receiving a trigger event from a trigger of the personal safety device including a gun barrel;
initiating recording video data via a front facing video camera of the personal safety device responsive to the trigger event, the front facing video camera to capture video data of a scene anterior to a front face of the personal safety device including the gun barrel;
initiating recording video via a rear facing video camera of the personal safety device responsive to the trigger event, the rear facing video camera to capture video data of a scene posterior to a rear of the personal safety device, wherein the scene posterior to the rear of the personal safety device is not obstructed by the personal safety device including the gun barrel;

initiating audio capture of audio from an environment within which the personal safety device is operating responsive to the trigger event;

caching the recorded video data and audio data in the memory of the personal safety device; and transmitting, via a wireless transmitter, the cached video data and audio data as a stream to a remote location over a network, and wherein the trigger further causes the personal safety device to initiate capture of GPS location information, time stamp information, operator identity information, personal safety device identity information, and a criticality level based on the degree of trigger pull by the operator of the personal safety device, and wherein the wireless transmitter is to transmit the recorded video data from the front and rear cameras and the captured audio data to the remote location over the network, the recorded video data and captured audio data includes live stream video data and audio data with the GPS location information, the time stamp information, the operator identity information, the personal safety device identity information, and a criticality flag based on the criticality level.

16. The non-transitory computer readable storage media of claim 15, wherein the personal safety device further includes:
a GPS sensor;
a time module;
a cache within the memory of the personal safety device;
wherein the trigger event is operator input indicating a trigger pull by an operator of the personal safety device, the trigger pull causing the memory to receive GPS data from the GPS sensor, to receive a time stamp from the time module, and to receive the video data from the front and rear cameras and the audio data from the audio capture device; and
wherein the instructions cause the personal safety device to perform operations further including: storing, via a data store of the personal safety device, the cached video data from the front and rear cameras and the audio data from the audio capture device.

17. A method performed by a personal safety device having at least a processor and a memory therein, wherein the method comprises:

receiving a trigger event from a trigger of the personal safety device including a gun barrel;

initiating recording video data via a front facing video camera of the personal safety device responsive to the trigger event, the front facing video camera to capture video data of a scene anterior to a front face of the personal safety device including the gun barrel;

initiating recording video via a rear facing video camera of the personal safety device responsive to the trigger event, the rear facing video camera to capture video data of a scene posterior to a rear of the personal safety device, wherein the scene posterior to the rear of the personal safety device is not obstructed by the personal safety device including the gun barrel;

initiating audio capture of audio from an environment within which the personal safety device is operating responsive to the trigger event;

caching the recorded video data and audio data in the memory of the personal safety device;

transmitting, via a wireless transmitter, the cached video data and audio data as a stream to a phone located proximally to the personal safety device; and transmitting, via wireless communication functionality of the smartphone, to a remote location over a network, including transmitting time stamp and GPS location information to the remote location, and wherein the trigger further causes the personal safety device to initiate capture of the GPS location information, the time stamp information, operator identity information, personal safety device identity information, and a criticality level based on the degree of trigger pull by the operator of the personal safety device, and wherein the wireless communication functionality of the smartphone is to transmit the recorded video data from the front and rear cameras and the captured audio data to the remote location over the network, the recorded video data and captured audio data includes live stream video data and audio data with the GPS location information, the time stamp information, the operator identity information, the personal safety device identity information, and a criticality flag based on the criticality level.

18. The method of claim 17 wherein the wireless transmitter comprises a Bluetooth transmitter.

* * * * *